(12) United States Patent
Rimoni

(10) Patent No.: US 7,251,490 B2
(45) Date of Patent: Jul. 31, 2007

(54) SYSTEM AND METHOD FOR GSM HARD HANDOFF

(75) Inventor: Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 10/871,232

(22) Filed: Jun. 18, 2004

(65) Prior Publication Data

US 2005/0037758 A1 Feb. 17, 2005

Related U.S. Application Data

(60) Provisional application No. 60/531,583, filed on Dec. 18, 2003, provisional application No. 60/479,777, filed on Jun. 18, 2003.

(51) Int. Cl.
*H04Q 7/20* (2006.01)
(52) U.S. Cl. .................. 455/436; 455/442; 370/331
(58) Field of Classification Search ............... 455/442, 455/437, 436, 422, 448, 438, 439, 432, 440, 455/552, 553, 426; 370/331, 335, 337, 320, 370/328, 342, 347
See application file for complete search history.

(56) References Cited

U.S. PATENT DOCUMENTS

| 5,978,679 | A | * | 11/1999 | Agre | 455/442 |
| 6,438,117 | B1 | * | 8/2002 | Grilli et al. | 370/331 |
| 6,594,489 | B2 | | 7/2003 | Holman | 455/432 |
| 6,704,581 | B1 | | 3/2004 | Park et al. | 455/553 |
| 6,804,519 | B1 | | 10/2004 | Czaja et al. | 455/442 |

* cited by examiner

*Primary Examiner*—George Eng
*Assistant Examiner*—Sam Bhattacharya
(74) *Attorney, Agent, or Firm*—Kam T. Tam; Charles Brown; Thomas R. Rouse

(57) ABSTRACT

A GSM1x-to-GSM handoff feature allows a GSM1x subscriber with a dual-mode (GSM1x and GSM modes) handset to seamlessly roam from GSM1x coverage areas to GSM coverage areas. This functionality is facilitated by the GSM1x system design which integrates a CDMA RAN with a standard GSM core network. The GSM1x system is built using standard CDMA as its air interface and an unmodified CDMA RAN with a standard IOS interface to the MSN. The only modifications are done at the MSN and the MS.

6 Claims, 11 Drawing Sheets

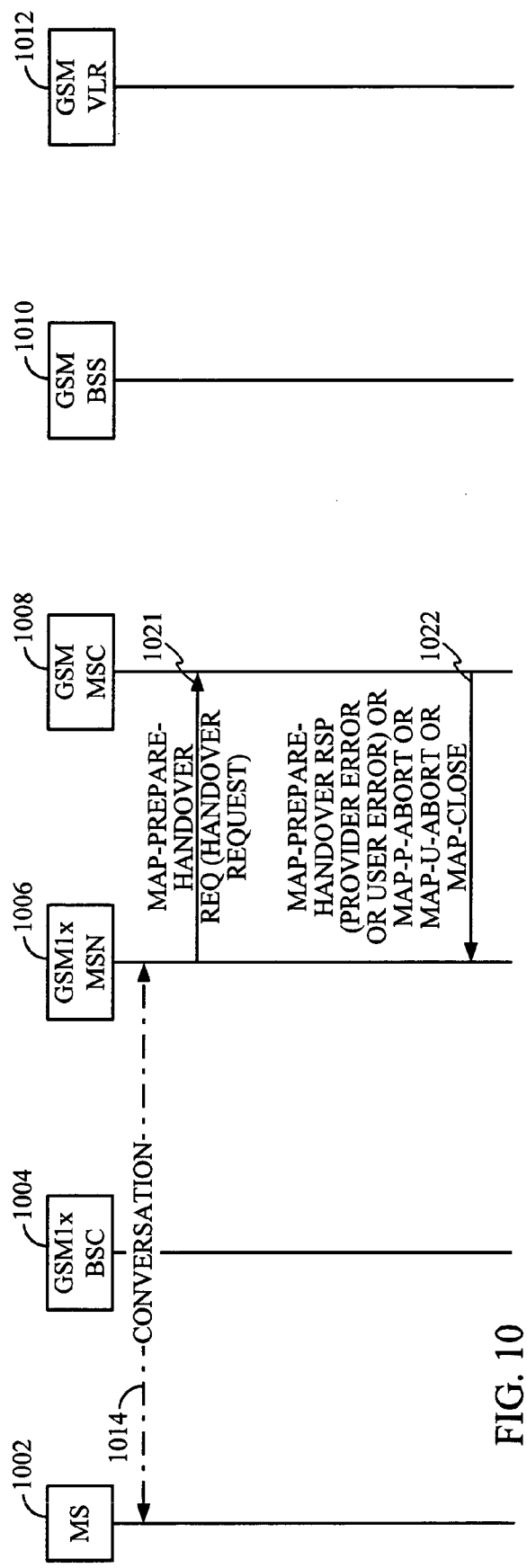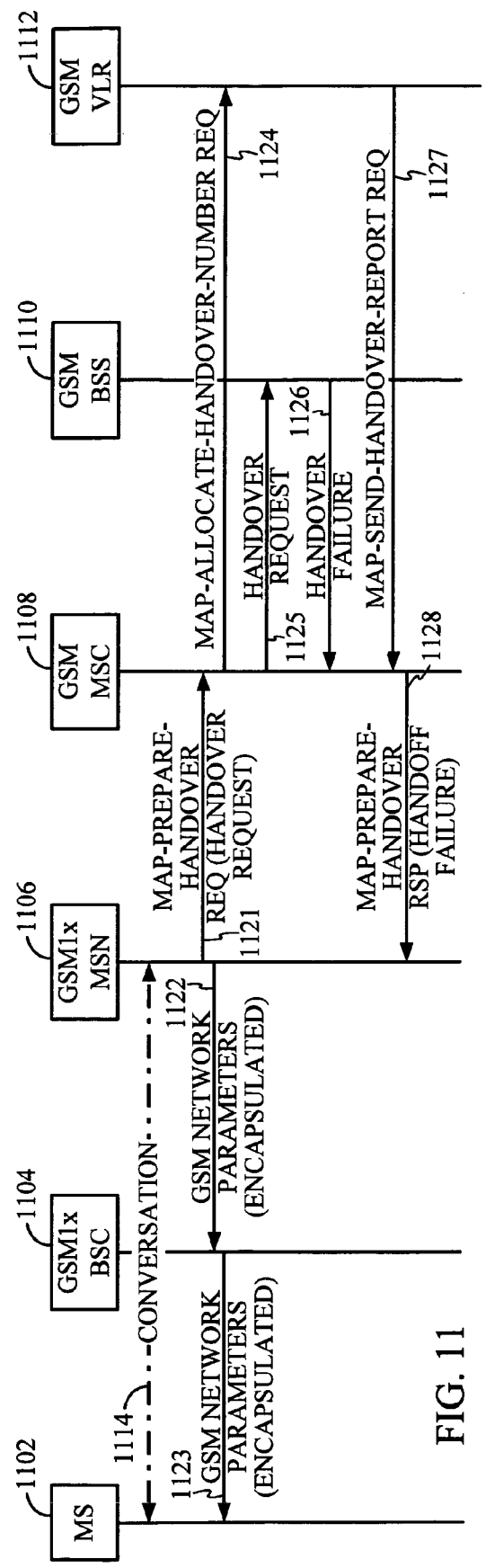
FIG. 10
FIG. 11

SYSTEM AND METHOD FOR GSM HARD HANDOFF

CLAIM OF PRIORITY UNDER 35 U.S.C. §119

The present Application for Patent claims priority to Provisional Application No. 60/479,777 entitled "GSM1x Hard Handoff Techniques" filed Jun. 18, 2003, and Provisional Application Ser. No. 60/531,583 filed Dec. 18, 2003 assigned to the assignee hereof and hereby expressly incorporated by reference herein.

BACKGROUND

1. Field

The present invention relates generally to communications systems, and more specifically, to systems and techniques for hard handoff between a GSM1x and GSM system.

2. Background

Acronyms

1×RTT—1× Radio Transmission Technology
3GPP—3rd Generation Partnership Project
Ack—Acknowledgement
ACM—Address Complete Message
ADDS—Application Data Delivery Service
AGC—Automatic Gain Control
AMPS—Advanced Mobile Phone Service
APDU—Application Protocol Data Unit
BCCH—Broadcast Control Channel
BSAP—Base Station Application Part
BSC—Base Station Controller
BSIC—Base Station Identity Code
BSMAP—Base Station Management Application Part
BSS—Base Station Subsystem
BSSAP—BSS Application Part
BSSMAP—BSS Management Application Part
BTS—Base station Transceiver Subsystem
CDMA—Code Division Multiple Access
CDMA2000—Third Generation CDMA
DLCI—Data Link Connection Identifier
DTAP—Direct Transfer Application Part
EIA—Electronic Industries Association
ETSI—European Telecommunications Standards Institute
FACCH—Fast Associated Control CHannel
FCCH—Frequency Correction Channel
GPS—Global Positioning System
GSM—Global System for Mobile communications
GSM1x—Convergence of GSM-MAP with CDMA
HLR—Home Location Register
HPLMN—Home PLMN
IAM—Initial Address Message
Id—Identification
IOS—Inter Operability Specification
IS—Interim Standard
LSC—Location Services
MAP—Mobile Application Part
ME—Mobile Equipment
MO—Mobile Originated
MPC—Mobile Position Center
MS—Mobile Station
MSC—Mobile Switching Center
MSM—Mobile Station Modem
MSN—Mobile Switching Node
MT—Mobile Terminated
OTD—Observed Time Difference
P—Provider
PLL—Phase Lock Loop
PLMN—Public Land Mobile Network
PN—Psuedo Noise
PSMM—Pilot Strength Measurement Message
RAN—Radio Access Network
Req—Request
RF—Radio Frequency
RR—Radio Resources
Rsp—Response
RTD—Real Time Difference
RX—Receive Terms Active Set: The set of pilots associated with the CDMA Channels containing Forward Traffic Channels assigned to a particular mobile station.

Candidate Set: The set of pilots that have been received with sufficient strength by the mobile station to be successfully demodulated, but have not been placed in the Active Set by the base station. See also Active Set, Neighbor Set, and Remaining Set.

Neighbor Set: The set of pilots associated with the CDMA Channels that are probable candidates for handoff. Normally, the Neighbor Set consists of the pilots associated with CDMA Channels that cover geographical areas near the mobile station. See also Active Set, Candidate Set, Remaining Set, and Private Neighbor Set.

Remaining Set: This is the set of all allowable pilot offsets as determined by PILOT_INC, excluding the pilot offsets of the pilots in the Active Set, Candidate Set, and Neighbor Set. See also Active Set, Candidate Set, and Neighbor Set.

Dedicated Mode: The Mobile is considered in dedicated mode when it has a dedicated link with the RAN. This link can be a Traffic Channel (TCH) or a Dedicated Control Channel (DCCH).

SUMMARY

In one aspect of the present invention, a method of handoff from a CDMA network to a GSM network, comprises determining a mobile is served by a CDMA border cell, sending the mobile a list of candidate GSM cells after determining the mobile is served by a CDMA border cell, sending a Mobile Switching Node (MSN) a candidate frequency search response message after receiving the list of candidate GSM cells, sending the mobile a candidate frequency search control message indicating that the mobile measure a surrounding GSM network, measuring the surrounding GSM network, sending a report of the measurements to the MSN, and selecting a GSM cell for handoff based on the report.

In another aspect, a Mobile Switching Node (MSN), comprises means for determining a mobile is served by a CDMA border cell, means for sending the mobile a list of candidate GSM cells after determining the mobile is served by a CDMA border cell, means for sending the mobile a candidate frequency search control message indicating that the mobile measure a surrounding GSM network, and means for selecting a GSM cell for handoff based on a report from a mobile of measurements of a mobile's surrounding GSM network.

In yet another aspect, a dual-mode mobile station, comprises an antenna for receiving and transmitting signals, a duplexer coupled to a transmitter and a receiver for switching between a transmitter and receiver, a receiver coupled to the duplexer for receiving signals, a transmitter coupled to the duplexer for transmitting signals, a GSM1x protocol stack used for performing handoff procedures to a CDMA network, a GSM protocol stack used for performing handoff procedures to a GSM network, and a processor coupled to the GSM1x protocol stack and the GSM protocol stack for performing handoff between CDMA and GSM networks, the processor also coupled to the receiver and transmitter for receiving and transmitting signals, respectively.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

FIG. 10 depicts a call flow diagram for MAP protocol errors in accordance with an embodiment;

FIG. 11 depicts a call flow diagram for failing to allocate radio resources at the GSM MSC;

DETAILED DESCRIPTION

In an embodiment, a GSM1x-to-GSM handoff feature allows a GSM1x subscriber with a dual-mode (GSM1x and GSM modes) handset to seamlessly roam from GSM1x coverage areas to GSM coverage areas. This functionality is facilitated by the GSM1x system design which integrates a CDMA RAN with a standard GSM core network. The GSM1x system is built using standard CDMA as its air interface and an unmodified CDMA RAN with a standard IOS interface to the MSN. The only modifications are done at the MSN and the MS. There are two major types of handoff scenarios:

Idle handoff
Dedicated mode (in-call) handoff
In idle mode, the design supports the following scenarios:
GSM1x to GSM
GSM to GSM1x
In dedicated mode, the design supports Hard Handoff from GSM1x to GSM. Handoff from GSM to GSM1x is not supported.

Network Topology

An MSN that has both GSM1x and GSM capabilities can be seen as having one GSM1x MSN and one GSM MSC housed in the same physical box. In an embodiment, the GSM1x MSN is connected to the GSM MSC using a MAP-E interface as shown in FIG. 1.

Figure 1:
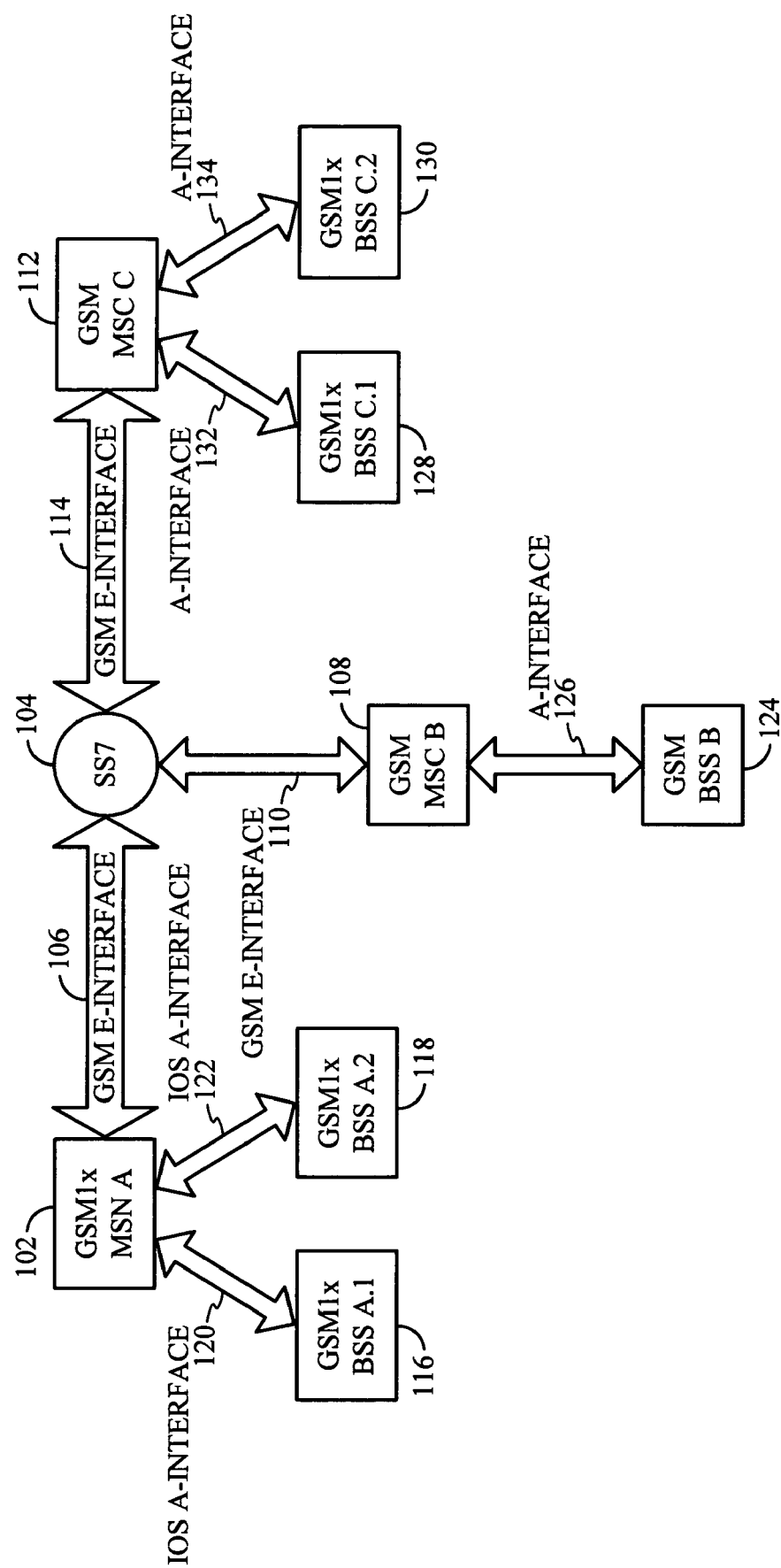
FIG. 1 shows a high level network topology in accordance with an embodiment.

FIG. 1 shows a high level network topology in accordance with an embodiment. A GSM1x MSN A 102 communicates with a Signaling System 7 104 via a GSM E-interface 106. A GSM MSC B 108 communicates with the Signaling System 7 104 via a GSM E-interface 110. A GSM MSC C 112 communicates with the Signaling System 7 104 via a GSM E-interface 114.

The GSM1x 102 communicates with GSM1x BSS A.1 116 and GSM1x BSS A.2 118 for example, via IOS A-interface 120 and IOS A-interface 122, respectively. GSM MSC B 108 communicates with GSM BSS B 124 via A-interface 126. GSM MSC C 112 communicates with GSM BSS C.1 128 and GSM BSS C.2 130 via A-interface 132 and A-interface 134, respectively.

The GSM1x MS has the ability to operate either over the IS-2000 air interface or the GSM air interface. This MS supports at least two protocols stacks:

GSM1x

Native GSM

The system design assumes that required changes are restricted to the GSM1x MSN or GSM1x MS. No changes can be made to any other GSM1x system component, in particular the RAN.

Mobile Station Features

In an embodiment, a GSM1x mobile station has the following features:

The MS has a dual protocol stack GSM1x and GSM.

The MS supports the GSM1x (1xRTT) and GSM air interface.

The MS supports the relevant GSM1x and GSM RF frequency bands.

The MS has the ability to switch between operating in GSM1x mode, and operating in GSM mode.

The MS supports the new version of the GSM1x authentication procedure. This procedure defines the transmission of the Mobile GSM Class Mark to the MSN as part of the authentication response message. In addition, the MS stores the Ciphering key sequence on the SIM.

The MS supports layer-2 message integrity while performing the HHO procedure between GSM1x and GSM.

The MS ignores the Inter Technology Handoff Command if it is not engaged (in dedicated mode).

The MS is able to read a provisioned GSM mobile station's classmark while operating in GSM1x mode.

Mobile Switching Node Features

In an embodiment, an MSN has the following features:

The MSN has a MAP-E interface to communicate with a given GSM MSC.

The MSN has an IOS interface to communicate with one or more 1xRTT BSC units.

The MSN supports the MAP-E interface definitions.

The MSN supports IOS interface definitions.

The MSN supports GSM1x authentication procedures. These procedures define the transmission of the Mobile GSM Class Mark to the MSN as part of the authentication response message.

The MSN keeps the Mobile GSM Class Mark information transmitted as part of the MS Authentication procedure and updates this information when a new Authentication response message is being received.

The MSN supports at least GSM R99 definitions.

Radio Access Network Features

In an embodiment, a RAN has the following features:

Has the ability to support foreign cell definition. Those cells are defined as belonging to a different network and are used to trigger a HHO procedure.

Supports an optional HANDOFF PERFORMED message.

Design

In an embodiment, the system design for idle mode Handoff covers GSM1x to the GSM and GSM to GSM1x idle mode handoff scenarios. In an embodiment, the system design of dedicated mode Handoff covers GSM1x to GSM dedicated mode handoff. The design defines the message flow and the procedures that need to take place inside the Mobile.

In an embodiment, system design of the different Handoff scenarios assumes that the Mobile has only one RF chain and that gated transmission is not supported by both the Mobile and by the RAN.

Figure 2:
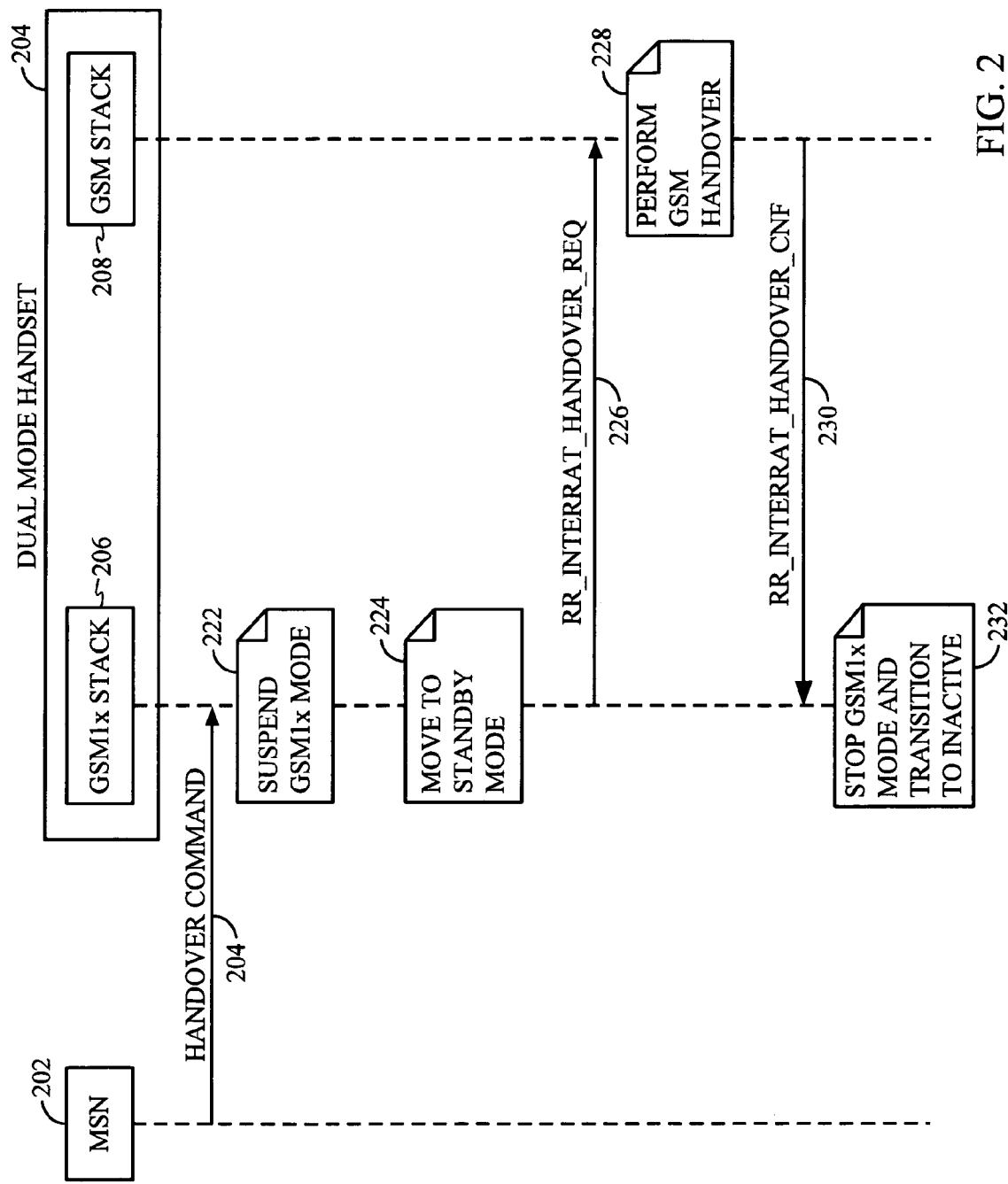
FIG. 2 shows the timing associated with switching between the GSM1x and GSM protocol stacks in accordance with an embodiment.

In an embodiment, a chip includes a dual stack that can support either CDMA 1x or GSM protocols. This chip has only one RF chain, hence it can either tune to a CDMA 1x network or GSM network. In accordance with an embodiment, a protocol exchange between a GSM1x stack and a GSM stack is shown in FIG. 2. FIG. 2 shows the timing associated with switching between the GSM1x and GSM protocol stacks, the GSM1x to GSM Internal Flow (RR Layer Only) in accordance with an embodiment.

In step 220, an MSN 202 sends a handover command to a mobile 204. In an embodiment, the mobile 204 is a dual-mode handset. The mobile 204 comprises a GSM1x stack 206 and a GSM stack 208. After receiving the handover command, the GSM1x stack 206 suspends GSM1x mode in step 222. In step 224, the GSM1x stack 206 moves to standby mode. In step 226, the GSM1x stack 206 sends a radio resources handover request, RR_INTERRAT_HANDOVER_REQ, to a GSM stack 208. In step 228, the GSM stack 208 performs a GSM handover. In step 230, the GSM stack 208 sends a RR_INTERRAT_HANDOVER_CNF to the GSM1x stack. In step 232, the GSM1x stack stops GSM1x mode and transitions to inactive.

As part of an Inter Technology Hard Handoff procedure the Mobile acquires a GSM network. The GSM network acquisition is performed in several steps. The Mobile starts to acquire the GSM signal based on the information it receives from an MSN regarding the GSM common channels, FCCH and SCH.

GSM Signal Acquisition

Figure 3:
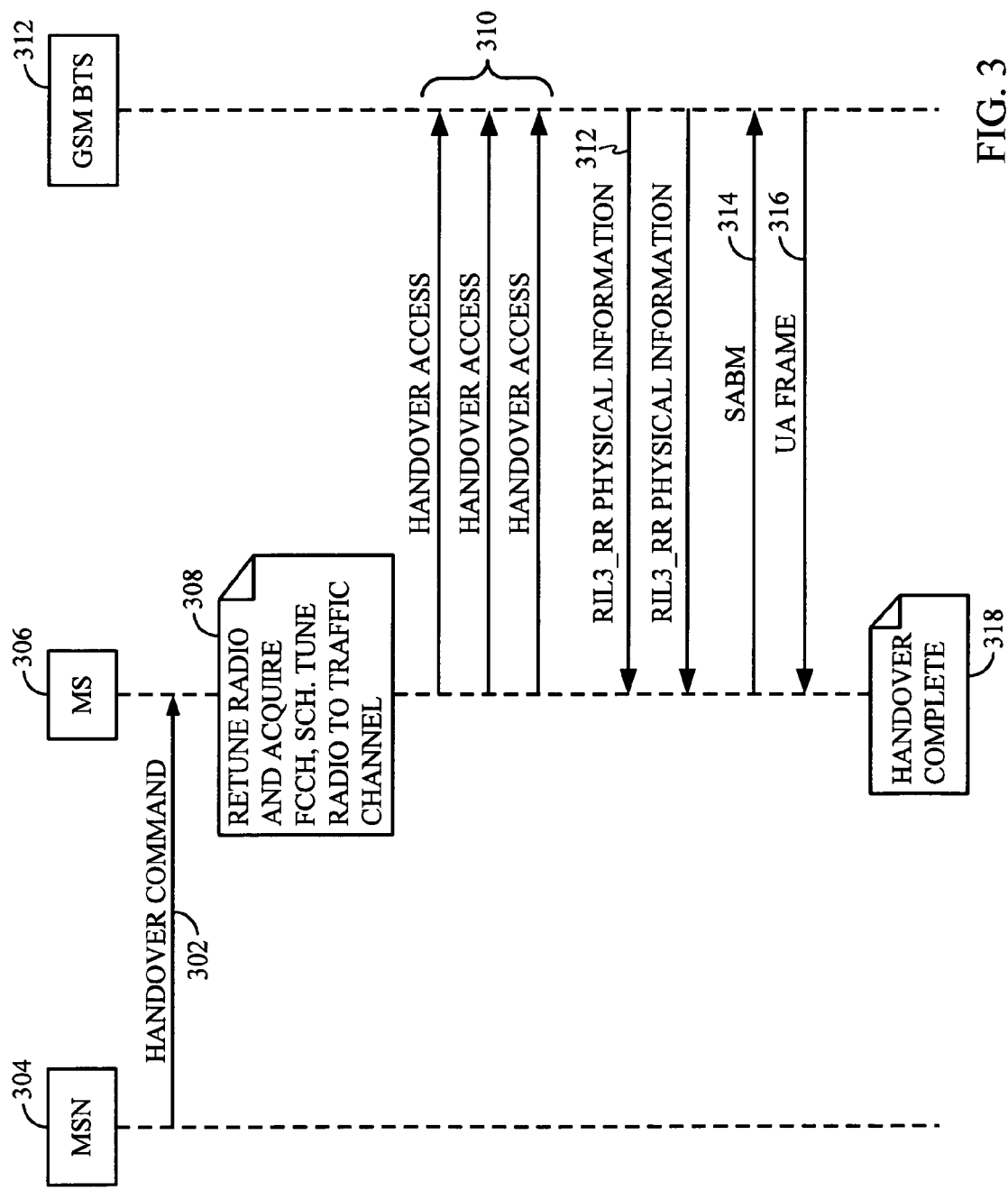
FIG. 3 illustrates the message flow for GSM signal acquisition in accordance with an embodiment.

FIG. 3 illustrates the message flow for GSM signal acquisition in accordance with an embodiment. In step 302, a Handover Command, from a GSM MSN 304 to a mobile 306, includes information about a new GSM channel, its characteristics, the power level to use, new SACCH etc. In step 308, the Mobile 306 tunes the radio to the appropriate frequency and starts sending "Handover Access" messages 310 on the FACCH to a GSM BTS 312.

In an embodiment, a GSM1x to GSM handover shall be asynchronous and the Mobile 306 shall have to determine the timing advance to apply. Therefore, the Mobile 306 shall wait for a RIL3-RR Physical Information message in step 312. A RIL3-RR Physical Information message helps the Mobile to sync with a new BTS.

In step 314, the Mobile 306 sends a Set Asynchronous Balanced Mode (SABM) message to the GSM BTS 312. In step 316, the GSM BTS 312 sends a UA frame to the Mobile 306. Once timing information is recovered; the Mobile 306 shall complete the handover process in step 318.

Inter-Technology Handoff

To perform an inter-technology handoff between GSM1x and GSM, the MS should have dual technology hardware (1xRTT and GSM), and a dual technology protocol stack (GSM1x and GSM).

In an embodiment, the MS supports more than one frequency band (dual band or triple band). However, in an embodiment wherein the MS has only a single RX chain, then the MS cannot activate more than one receive technology chain simultaneously.

There are two basic handoff scenarios: Idle mode handoff and Dedicated mode handoff. In Dedicated mode, there is a further classification based on the type of service with which the MS is engaged. Voice and Circuit Switch data services differ from Packet Switch data services. The following sections address inter-MSC handoff for Idle mode and Dedicated mode (Circuit Switch services only).

Idle Mode System Selection

In an embodiment, the Mobile shall perform idle hard handoff in the following cases:

Upon Power Up (Operation Mode Selection)

When the signal reception of the current operation mode technology (GSM1x or GSM) is below a certain given threshold (system is considered lost)

When instructed to do so by the network

User selection

Power Up

When the Mobile is being powered up it shall attempt to use the last known mode, either GSM1x or GSM. If the Mobile fails to acquire the last known mode for ~1 minute, it shall revert to the second operation mode and attempt to acquire it. If again the Mobile fails to acquire the selected mode for ~1 minute, it shall revert back to the original mode. This time, the Mobile shall enter into sleep mode for TBD time before stating the acquisition process. Entering sleep mode shall reduce battery consumption.

The entire process shall continue until the Mobile is able to acquire one of the operation modes. When switching between operation-modes the Mobile perform the regular system determination algorithm defined of that operation mode.

System Lost

When the Mobile loses the signal of the mode it is camping on, it shall behave in a similar way to power up mode acquisition. The Mobile shall attempt to camp on the last known mode, either GSM1x or GSM. If the Mobile fails to acquire the last known mode for TBD consecutive attempts, it shall revert to the second operation mode and attempt to acquire it. If the Mobile fails to acquire this mode for ~1 minute, it shall revert back to the original mode. This time it shall attempt acquisition for only ~1 minute.

This process shall continue till the Mobile is able to acquire one of the operation modes. When the Mobile wakes up after deep sleep mode it shall perform the same procedure defined for power up.

Network Command

In certain cases it is desired to instruct a Mobile which is camping on a GSM mode to reselect the Mode it is camping on and switch over to a GSM1x mode. A dual mode Mobile (GSM1x/GSM) that is camping initially on a GSM mode where only GSM coverage is provided may be instructed to move to the GSM1x mode upon entering the GSM1x mode coverage area. There are several technologies to support this operation:

Position based

SMS Cell Broadcast

The rest of this section shall elaborate on using SMS Cell Broadcast for this purpose. The SMS Cell Broadcast is described in GSM 03.41. This service allows sending a message periodically to all Mobiles in a given predefined geographical area. Using this service the operator can send a unique message to all GSM cells that are on the edge of the GSM1x overlay coverage area. This message shall instruct the dual mode Mobiles to tune to the GSM1x technology.

In GSM the SMSCB technology is used to transmit different types of messages (i.e., weather reports, news, etc.). Each user can subscribe to certain set of services. To accommodate the specific service required for Idle HHO, there are two options:

1 A certain global service number shall be allocated. This shall require changing the GSM standard. This is less appealing approach and changing the GSM standard shall be hard to achieve and should be avoided.

2 An operator specific service number shall be assigned. This assignment shall be operator specific and shall be part of the Mobile provisioning at the SIM level ($EF_{CBMI}$, $EF_{CBMID}$ and $EF_{CBMIR}$). This is a better approach and does not require any GSM standard changes.

To avoid unnecessary inter technology idle hard hand off between GSM and GSM1x it is suggested to trigger this hard handoff only after the Mobile receives at least two consecutive SMSCB messages.

The SMS Cell Broadcast (SMSCB) is initiated by sending a WRITE-REPLACE Request (see GSM 03.41 section 9.1.2) from the Cell Broadcast Center (CBS) to the BSC. This request contains the following fields:

Message Identifier

See GSM 03.14 section 9.2.1. Using the definitions of section 9.3.2.2 of GSM 03.14 it is recommended to select a value in the range 1100-9FFF (hex) and include the value on the ME search list. The proposed range is currently reserved but not prohibited.

New Serial Number

See GSM 03.14 section 9.2.3. Using the definition of section 9.3.2.1 of GSM 03.14 it is recommended to set this 16 bit field as follows:
  GS (2 bits) shall be set to 01 (PLMN wide).
  Message Code (10 bits) shall be set to 1.
  Update number (4 bits) shall be initialized to zero.

Cell List
  See GSM 03.14 section 9.2.5.1. This list shall contain all GSM cells in the border of the GSM1x coverage area.

Repetition Period

See GSM 03.14 section 9.2.8. The basic repetition period is 1.883 seconds. This file can be set in the range 1 to 1024, where each unit defines one basic repetition period.

No of Broadcast Requested

See GSM 03.14 section 9.2.9. This field shall be set to zero, so the message shall be transmitted indefinitely.

Number of Pages

See GSM 03.14 section 9.2.4. This field should be set to 1.

Data Coding Scheme

See GSM 03.14 section 9.2.18.

CBS Message Information Page #1

See GSM 03.14 section 9.2.19. This filed contains the actual message and should not exceed 82 octets. If the message is less than that, the message should be padded. It is recommended to leave this field empty (padding only).

CBS Message Information Length #1

See GSM 03.14 section 9.2.20. This field contains the actual size of the information. Based on the recommendation for the content of the Message Information (see above), this field should be set to zero.

User Preferences

The user shall be provided with an option to set the mode selection mode to automatic or manual. When selecting the manual mode, the user shall be able to override the automatic selection and manually select a preferred mode. In the user-preferred manual mode, the Mobile shall attempt to tune to the user-selected mode. If the Mobile fails to acquire the mode an appropriate message shall be displayed to the user and the user shall be able to select another mode, keep current selection or revert to the automatic selection mode.

If the user manually selects the GSM system the Mobile shall ignore the SMSCB messages instructing it to change to the GSM1x system.

Dedicated Mode Handoff

Figure 4:
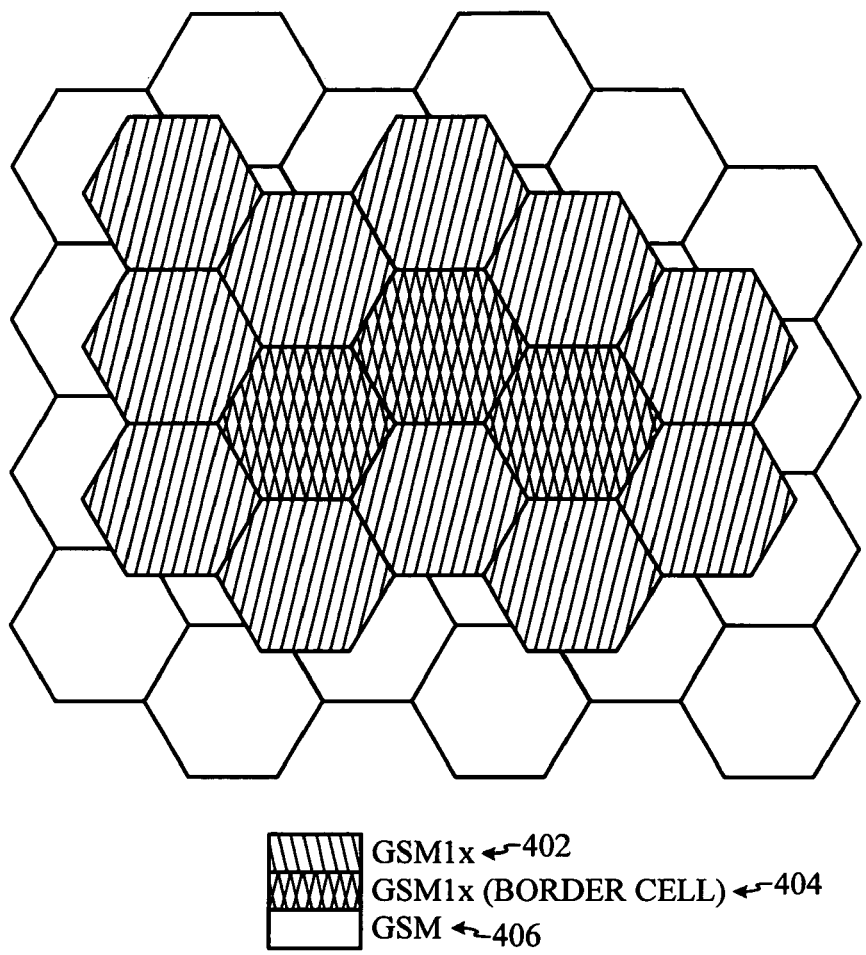
FIG. 4 illustrates pilot beacon units (transition cells) in accordance with an embodiment.

To be able to maintain service while a handoff occurs between GSM1x and GSM, there should be an overlap between the coverage areas of the two technologies in the handoff zone. The example provided in FIG. 4 illustrates using Pilot Beacon or Border Cell for HHO detection. FIG.

4 illustrates pilot beacon units (transition cells) in accordance with an embodiment. GSM1× cells 402, GSM1× border cells 404, and GSM cells 406 are shown.

Time Constraints

Table 1 provides example information on CDMA 1× network characteristics.

| Frequency | Environment | Cell Radius |
|---|---|---|
| Figure | Urban | 1.4 km |
| 5800 MHz | Suburban | 3.2 km |
|  | Rural | 19 km |
| 1900 MHz | Urban | 0.8 km |
|  | Suburban | 2.2 km |
|  | Rural | 15 km |

Figure 5:
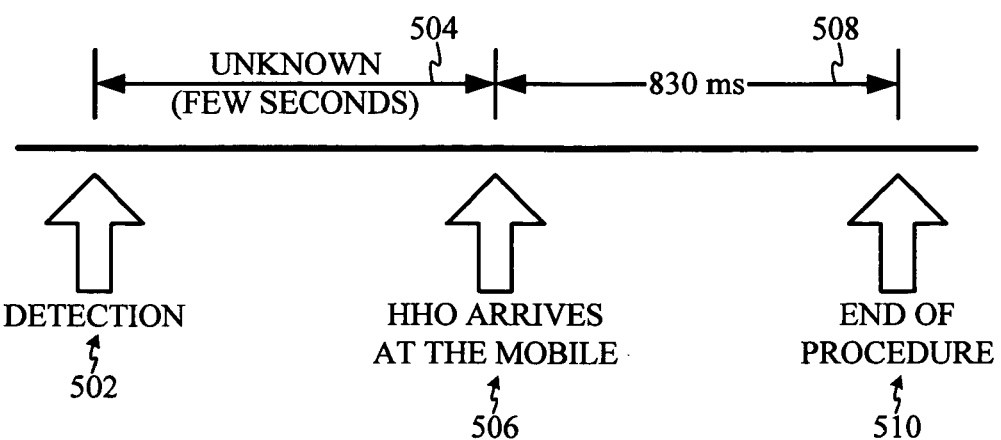
FIG. 5 shows the detection point 502.

Shows a time line of the hard handoff procedure in accordance with an embodiment. Although the time duration of first phase of the procedure, from the detection point till the arrival of the hard handoff command at the Mobile, is unknown yet, it can be assumed that the entire procedure should not exceed several seconds. This does not create any hard constraint on Mobile moving speed even in a dense urban area. FIG. 5 shows the detection point 502. An unknown few seconds later 504, an HHO arrives at the mobile 506. An exemplary time of 830 ms later 508 is the end of the HHO procedure 510.

HHO Detection

Part of the Inter Technology Hard Handoff procedure is to be able to properly detect the need to perform the handoff. Methods for detection include:

Using Pilot Beacon units

Using Border Cell units

Using Position Location information

Using dual RF chain and concurrent reception of 1x and GSM signaling

Using modified Candidate Frequency Search

Candidate Frequency Search

In this method, the Mobile stops its transmission in predefined time intervals, and tunes its RF chain to measure the signal strength of cells in another frequency and report these strength measurements back to the BSC it communicates with. Based on these reports the current BSC used by the Mobile can direct the Mobile to use a cell in another frequency.

Adaptation to GSM1×

An algorithm for measuring the cell of the underlying GSM network, when operating in GSM1× and approaching the border of the GSM1× coverage area shall be controlled by the MSN and not the RAN in accordance with an embodiment. For each Border Cell of the GSM1× network, the MSN shall hold a list of the GSM cell covering the same geographical area. For each cell the MSN shall hold its frequency and BSIC.

It is assumed that all GSM cells belong to the same PLMN.

The messages being exchanged between the MSN and the Mobile during the procedure described in this memo shall use a GSM1× Signaling Protocol with PROTOCOL_TYPE=0100.

Normal Operation

Figure 6:
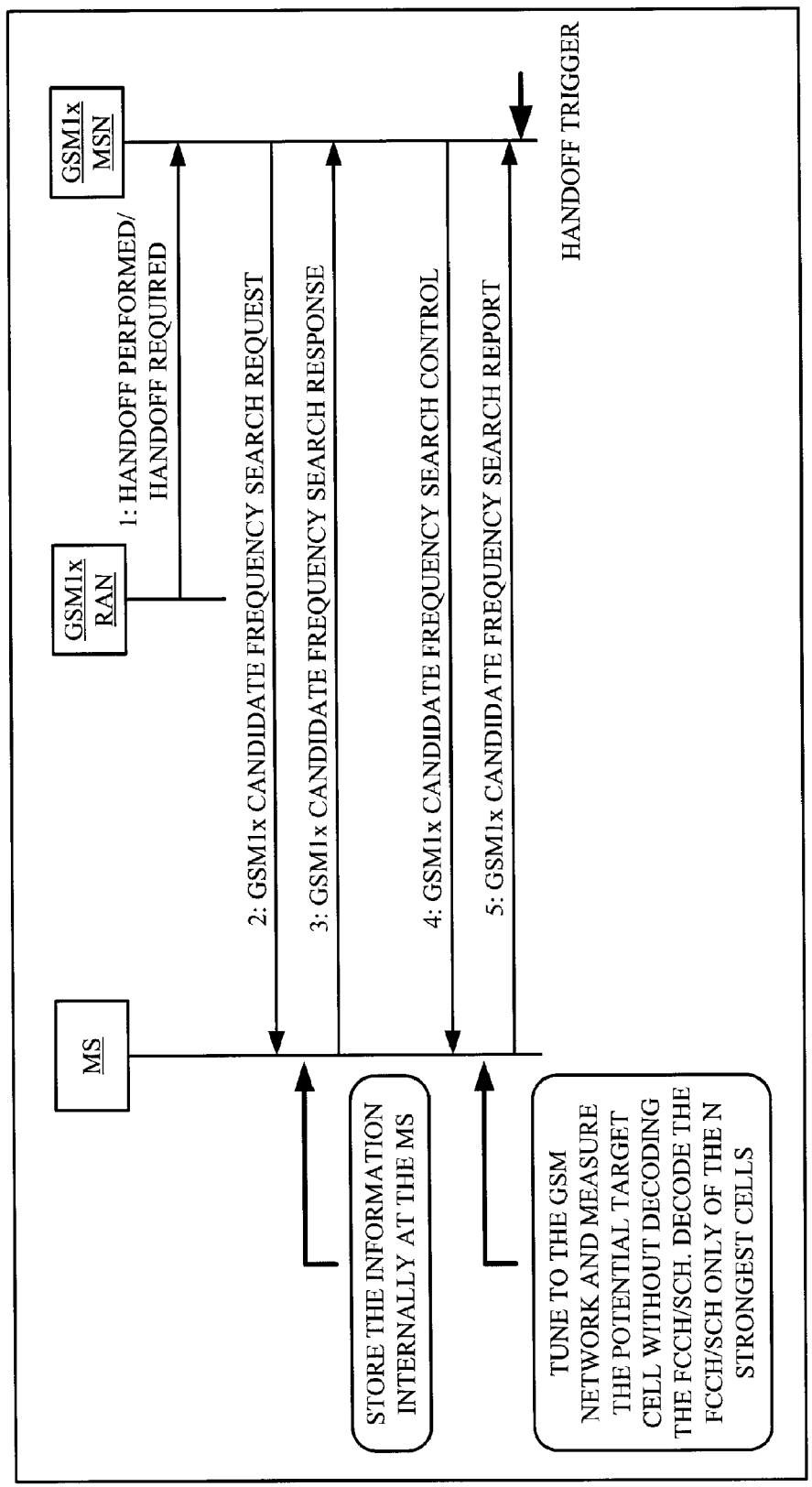
FIG. 6 shows a Message Flow in accordance with an embodiment.

FIG. 6 shows a Message Flow in accordance with an embodiment.

Step #1

The trigger for starting the GSM1× to GSM can be an Intra-BSC handoff to a Border Cell or an Inter-BSC handoff request to a Border Cell or a Pilot Beacon.

A Mobile cannot be handed off to a Pilot Beacon since a Pilot Beacon unit is a stripped-down CDMA cell that transmits only the Pilot channel. Therefore, all Pilot Beacon units are connected to a set of dedicated BSC units that are different from the BSC units used by the regular cells. In this case the MSN will recognize the Pilot Beacon in the Handoff Required message (See step 2) and not actually proceeding with the handover to the Pilot Beacon however use this as a trigger in the same method as described in this section for an Inter BSC handoff to a Border cell.

In case that the handoff to a Border Cell is an intra-BSC handoff, the BSS (GSM1× RAN) uses a Handoff Performed Message to inform the MSN of handoff operations (see message #1 in FIG. 6.

The following text is quoted from IS-2001.4-B section 2.4.9:

An intra-BS handoff is a handoff performed under the domain of one BS. As such, the MSC is not involved in the execution of the handoff. Once an intra-BS handoff is successfully completed, the BS may inform the MSC via a Handoff Performed message.

When the sector identified as the "designated cell" is removed from the call, the BS currently serving as the source BS for the call chooses a new "designated cell" from the set of sectors serving the call and shall provide the appropriate cell identifier to the MSC.

In the above quoted text the "MSC" should be replaced by "MSN" for the GSM1× architecture.

In case that the handoff to the Border Cell is an inter-BSC handoff, the BSS (GSM1× RAN) uses the Handoff Required Message to inform the MSN that handoff operation is required.

Step #2

When the MSN determines that the Mobile is served only by a single GSM1× Border Cell or a set of GSM1× Border Cells, the MSN shall provide the Mobile with a list of candidate GSM cells that cover the same geographic area as the border GSM1× cell(s) being used by the Mobile. The GSM1× Candidate Frequency Search Request Message used by the MSN is based on the Candidate Frequency Search Request Message. The message structure is defined as follows in table 2.

TABLE 2

| Field | Length (Bits) |
|---|---|
| CFSRM_SEQ | 2 |
| SEARCH_TYPE | 2 |
| SEARCH_PERIOD | 4 |
| SEARCH_MODE | 4 |
| GSM_BAND | 4 |
| MODE_SPECIFIC_LEN | 8 |
| Mode-specific fields | 8 × MODE_SPECIFIC_LEN |

CFSRM_SEQ—Candidate Frequency Search Request Message sequence number

The MSN shall set this field to a GSM1× Candidate Frequency Search Request Message sequence number.

SEARCH_TYPE—Search command

The MSN shall set this field to the appropriate SEARCH_TYPE code to indicate the purpose of the message.

The valid values for GSM1× are:

'00'—The Mobile should stop any periodic search in progress

'01'—The Mobile should perform a periodic search

SEARCH_PERIOD—Time between successive searches on the Candidate Frequency for periodic searches The MSN shall set this field to the SEARCH_PERIOD value corresponding to the search period to be used by the Mobile, i.e., the time between the beginning of successive searches on the Candidate Frequency.

SEARCH_MODE—Search mode

The MSN shall set this field to '1111' (GSM1× specific).

GSM_BAND

The MSN shall set this field according to the GSM frequency band used by the specific GSM target network. Table 3 provides the possible values.

TABLE 3

| GSM Frequency Band | Value |
|---|---|
| 900 MHz | 0000 |
| 1800 MHz | 0001 |
| 1900 MHz | 0010 |
| 450 MHz | 0011 |
| 850 MHz | 0100 |
| 2100 MHz | 0101 |
| Reserved | 0110-1111 |

MODE_SPECIFIC_LEN—Length of mode-specific fields

The MSN shall set this field to the number of octets in the mode-specific fields of this message.

Mode-Specific Fields—Search mode-specific fields

The MSN shall include the following fields in table 4 for every candidate GSM cell in accordance with an embodiment.

TABLE 4

| Field | Length (Bits) |
|---|---|
| GSM_CELL_ID | 4 |
| Reserved_01 | 4 (0000) |
| BSIC | 6 |
| Reserved_02 | 2 (00) |
| GSM_CELL_FREQ_OFFSET | 8 |

GSM_CELL_ID

The MSN shall set this field to the cell identification of the specific GSM cell.

BSIC

The MSN shall set this field to the BSIC used by the specific GSM cell.

GSM_CELL-FREQ-OFFSET

The MSN shall set this field to the frequency offset in steps of 200 KHz used by the specific GSM cell.

Upon receiving the GSM1× Candidate Frequency Search Request Message the Mobile shall store the information been received and shall proceed with Step #3.

Step #3

After receiving the GSM1× Candidate Frequency Search Request Message from the MSN, the Mobile replies to the MSN with a GSM1× Candidate Frequency Search Response Message. This message is identical to the native CDMA Candidate Frequency Search Response Message.

Step #4

When the MSN determines that the Mobile should start measuring the surrounding GSM network it shall instruct the Mobile to do so. The GSM1× Candidate Frequency Search Control Message used by the MSN is based on the Candidate Frequency Search Control Message. The message structure is defined as shown in table 5.

TABLE 5

| Field | Length (Bits) |
|---|---|
| CFSCM_SEQ | 2 |
| SEARCH_TYPE | 2 |

CFSCM_SEQ—GSM1× Candidate Frequency Search Control Message sequence number

The MSN shall set this field to the Candidate Frequency Search Control Message sequence number.

SEARCH_TYPE—Search command

The MSN shall set this field to the appropriate SEARCH_TYPE code to indicate the purpose of the message.

The valid values for GSM1× are:

'00'—The Mobile should stop any periodic search in progress

'01'—The Mobile should perform a periodic search

Step #5

After receiving the GSM1× Candidate Frequency Search Control Message from the MSN, the Mobile shall attempt to measure the surrounding GSM network at the next available frame boundary (20 ms).

Figure 7:
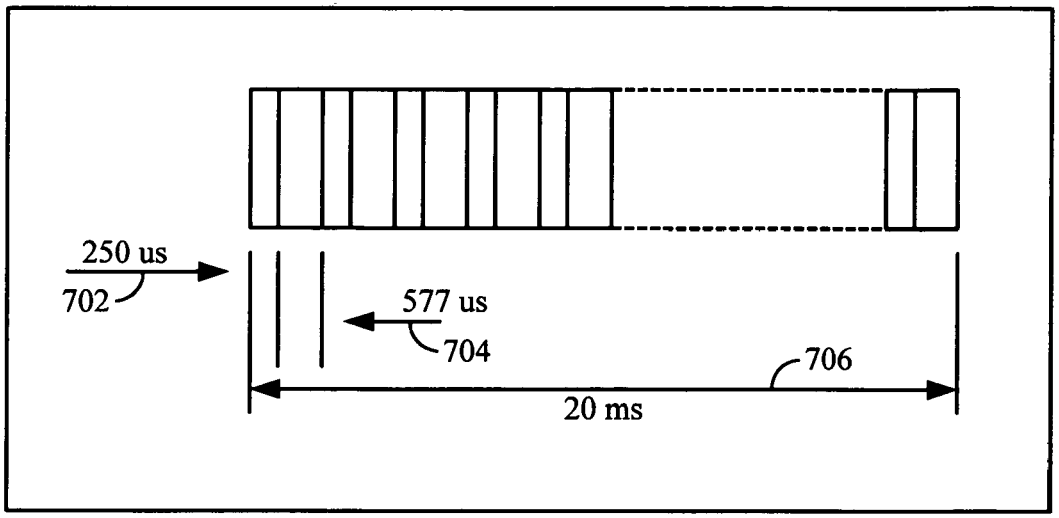
FIG. 7 illustrates a GSM energy measurement in accordance with an embodiment.

FIG. 7 illustrates a GSM energy measurement. In an embodiment, to measure one GSM cell, it requires 250 us 702 to tune the RF and 577 us 704 for the actual measurement, given a total of 827 us. The minimal time the Mobile is away from the GSM1× network is 20 ms (one frame) 706, which allows it to measure up to 24 different GSM cells. In an embodiment, this measurement is repeated three times to average the results.

Based on the above numbers, the Mobile shall need to hop 3 times to measure the surrounding GSM network. Each hop is 20 ms and the gap between hops is 480 ms. Hence, the overall measurement shall span over 1.5 seconds (See FIG. 8).

Figure 8:
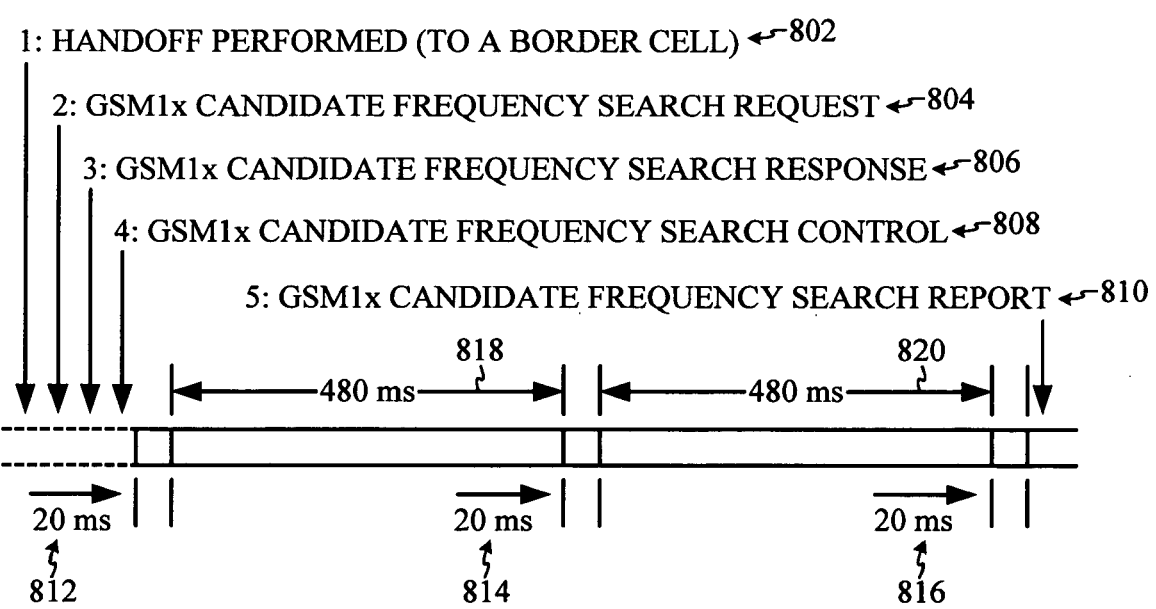
FIG. 8 shows GSM Measurement using a Candidate Frequency Search.

FIG. 8 shows GSM Measurement using a Candidate Frequency Search. In step 802, a handoff is performed to a border cell. In step 804, a GSM1× candidate frequency search request is issued. In step 806, a GSM1× candidate frequency search response is sent. In step 808, a GSM1× candidate frequency search control is issued. In step 810, a GSM1× candidate frequency search report is issued. Hops 812, 814, and 816 are shown as 20 ms. Gaps 818, 820 between hops are shown as 480 ms.

After the Mobile has finished the measurements, it reports the results back to the MSN using the GSM1× Candidate Frequency Search Report Message. This message is based on the Candidate Frequency Search Report Message. The message structure is defined as shown in table 6.

TABLE 6

| Field | Length (Bits) |
|---|---|
| LAST_SRCH_MSG | 1 |
| LAST_SRCH_MSG_SEQ | 2 |
| SEARCH_MODE | 4 |
| Reserved | 1 (0) |
| MODE_SPECIFIC_LEN | 8 |
| Mode-specific fields | 8 × MODE_SPECIFIC_LEN |

LAST_SRCH_MSG—Indicator for the type of message that started the search being reported If this message is being sent to report the results of a single search or a periodic search started by a GSM1x Candidate Frequency Search Control Message or by a GSM1x Candidate Frequency Search Request Message, the Mobile shall set this field to '0'; otherwise, the mobile station shall set this field to '1'.

LAST_SRCH_MSG_SEQ—Sequence number received in the message that started the search being reported If this message is being sent in response to a GSM1x Candidate Frequency Search Control Message, the Mobile shall set this field to the value of the CFSCM_SEQ field from the GSM1x Candidate Frequency Search Control Message.

If this message is being sent in response to a GSM1x Candidate Frequency Search Request Message, the Mobile shall set this field to the value of the CFSRM_SEQ field from the GSM1x Candidate Frequency Search Request Message.

SEARCH MODE—Search mode

The Mobile shall set this field to the SEARCH_MODE value corresponding to the type of search specified by the GSM1x Candidate Frequency Search Request Message that specified the search parameters. This field shall be set to '1111' (GSM1x specific).

MODE_SPECIFIC_LEN—Length of mode-specific fields

The Mobile shall set this field to the number of octets in the mode-specific fields of this message.

Mode-Specific Fields—Search mode-specific fields

The Mobile shall include the following fields in table 7 for every candidate GSM cell.

TABLE 7

| Field | Length (Bits) |
|---|---|
| GSM_CELL_ID | 4 |
| Reserved | 4 (0000) |
| GSM_CELL_FREQ_OFFSET | 8 |
| TOTAL_RX_PWR | 8 |

GSM_CELL_ID

The Mobile shall set this field to the cell identification of the specific GSM cell.

GSM_CELL_FREQ_OFFSET

The Mobile shall set this field to the frequency offset in steps of 200 KHz used by the specific GSM cell.

TOTAL_RX_PWR

The Mobile shall set this field to the TOTAL_RX_POWER measured for the specific GSM cell.

Upon receiving the GSM1x Candidate Frequency Search Report Message the MSN shall parse the information contained in the message. Based on this information the MSN shall select the best target GSM cell and shall initiate the HHO procedure, sending a Handover Required Message to the appropriate GSM MSC.

Abnormal Operation

During the Candidate Frequency Search, the MSN may receive further Handoff Performed Message from the BSS (GSM1x RAN). If a received Handoff Preformed Message implies that the Mobile is not on the edge of the GSM1x coverage area any more, the MSN shall abort the Candidate Frequency Search operation using the GSM1x Candidate Frequency Search Request Message or the GSM1x Candidate Frequency Search Control Message with the SEARCH_TYPE field equals '00'.

Signal Power Measurement

Hard Handoff is based on signal power estimation. The goal is to analyze the signal power estimation in the presence of Fading and Shadowing effects. It is assumed that receiver noise is minor due to averaging.

Fading

Fading a propagation effect in non-Line-Of-Sight environment, were the received power at the mobile has Raleigh distribution with parameter $f_d$ (Doppler spread).

$$f_d = F_c * v/c$$

Where: $F_c$ is the carrier frequency v is the mobile speed (m/sec)

C is the light speed (3*108 m/sec)

The correlation time constant is: $t_{au} \approx 0.3/f_d$

Received power STD due to fading is 5.5 dB.

Shadowing

Shadowing is a propagation effect that models the received power changes due to receiver location (obstructions and reflections). By definition, the shadowing changes are slower than Fading, and are caused by the environment regardless of carrier frequency.

Shadowing is modeled by a log-normal distribution, with variance of 7.5 dB. Spatial variations are modeled by the autocorrelation parameter: 8÷20 meter. The assumption is 10 meter in the following calculations.

Table 8 shows Time Constants (@$F_{carrier}$=850 MHz).

TABLE 8

| | Velocity | | |
|---|---|---|---|
| Model | 3 Km/h | 50 Km/h | 100 Km/h |
| Fading | 127 msec | 7.6 msec | 3.8 msec |
| Shadowing | 12000 msec | 720 msec | 360 msec |

Table 9 shows Power Estimation Error (standard deviation).

TABLE 9

| Number of Integrations | 100 Km/h | 30 Km/h | 10 Km/h | 3 Km/h |
|---|---|---|---|---|
| 1 | 6.0195 | 5.9771 | 5.6461 | 4.6034 |
| 2 | 4.2310 | 4.0861 | 4.0214 | 2.9865 |
| 3 | 3.4274 | 3.4274 | 3.3586 | 2.7259 |
| 4 | 3.1235 | 3.1287 | 2.9226 | 2.3339 |
| 5 | 2.8890 | 2.8556 | 2.5262 | 2.0349 |

All numbers are in dB.

In an embodiment, the received power is averaged over 3 periods of 480 ms. This method will give less then 3.5 dB of received power measurement (standard deviation). A larger averaging time will improve the estimation.

If the neighbor list is small enough, it will be better if in each 20 ms period there will be two measurements of each frequency, 10 ms apart. In this case there will be six measurements in the same time span. Note that power averaging is in the power domain, not log (dB) domain.

Enhancements

Interrupting the transmission in dedicated mode impacts the voice quality. Therefore, the duration of the time period the Mobile does not transmit/receive should be minimal to maintain adequate quality of services.

Power measurement may not be enough to select the target cell in a GSM system. The measurement can return a false result due to:

A strong frequency, which is only used for traffic (no BCCH), and is different from the cell indicated in the neighbor list.

Two or more BCCH frequencies using the same frequency (reuse 4/12 is not very robust)

A strong out of system interferer

A strong adjacent channel interferer

To enhance the algorithm provided in the previous section and to eliminate false detection that shall lead to drop calls, the Mobile performs the same basic power measurement as before, however it shall not report the result to the MSN. Instead it shall order the results in descending order. For a pre defined number of potential target GSM cells, which are the strongest, the Mobile shall attempt to decode their FCCH and SCH to make sure this is a real GSM cell. The report back to the MSN shall be only for those GSM cells that are strong enough and their FCCH/SCH were successfully decoded.

On a 51 multi-frame configuration the SCH is transmitted on frames 1, 11, 21, 31, 41, which gives an average period of about 47 ms. The SCH is always preceded by the FCCH, which is a simple training sequence. If the FCCH is found, the SCH location is known, it is (4.615 ms later). The Mobile shall use the FCCH to synchronize itself with the GSM framing and than shall decode the SCH to retrieve the PLMN and BSIC numbers.

Measuring energy of the target GSM cells

Methods for measuring the energy of the target GSM cells are shown below. These methods need further enhancements in the mDSP to enable proper synchronization with the GSM FCCH and decoding of the SCH.

Using a CDMA Chip and mDSP

Continue using the CDMA chip as in CDMA mode, but tune it to the GSM frequency of the cell to be measured. The mDSP shall filter the signal to isolate the GSM channel (200 KHz) and shall measure the power. The result shall be reported to the ARM for further processing.

Using a GSM Chip and mDSP

Switch to the GSM chip as in GSM mode and tune it to the GSM frequency of the cell to be measured. The mDSP shall filter the signal to isolate the GSM channel (200 KHz) and shall measure the power. In this case the filter requirements are relaxed since the GSM chip includes an analog filter for the GSM channel. The result shall be reported to the ARM for further processing.

There is a need to verify if the RTR can be activated concurrently with the RFR and hence shorten the time required for tuning.

Using a CDMA chip and External power meter (For testing only)

Continue using the CDMA chip in CDMA mode, but tune it to the GSM frequency of the cell to be measured. Add an external power meter that should include a GSM channel filter (200 KHz). This power meter can be connected to the ARM via the SBI. The ARM shall synchronize the power meter measurements via SBI commands.

This option is less desirable, because it requires that some additional hardware shall be added to the Mobile.

Call Setup in Border Cell

The Mobile has no awareness that it is within a Border Cell. When the Mobile attempts to setup a call in a boarder cell the MSN shall validate the origination cell ID using a MSN Configuration Table. If the Mobile serving cell is a Border Cell and the Mobile ClassMark indicates that the Mobile is a dual mode Mobile, the MSN shall instruct the Mobile to move to the GSM network. If the Mobile is not dual mode, the MSN shall proceed with the call setup.

MSN Configuration Table

The current design assumes that there is a one-to-one correlation between the foot print of the source GSM1x cell and the target GSM cell at the boundary of the GSM1x coverage area. For each cell served by the MSN, the MSN holds the following information elements as shown in table 10. Table 10 describes MSN Configuration Table Information Elements.

TABLE 10

| Information Element | Value |
|---|---|
| Cell Identification Number | This is the number that identifies a specific cell within the GSM1x network. |
| BSC Identification Number | This is the number that identifies the BSC that controls the above cell within the GSM1x network. |
| Border Cell Indicator | A Boolean flag that defines if the Cell is on the border of the GSM1x network or not. The Border Cell Indicator defines the validity of the following information elements. These elements are valid only if the flag is set to TRUE. |
| Collocated GSM Cell Identification Number | This is the number that identifies the GSM cell, which is closest to the above GSM1x cell. |
| Collocated GSM Cell's Frequency Channel | This is the frequency used to transmit the FCCH and SCH of the GSM cell. |
| Collocated GSM Cell's BSIC | This is the BSIC used by the specific GSM cell. |
| Collocated GSM Cell's MSC Number. | This is the number that identifies the MSC that controls the above cell within the GSM network. |

Table 11 provides an example of two typical entries in an MSN Configuration table.

TABLE 11

| GSM1x Cell ID | GSM1x BSC ID | Border Ind. | GSM Cell ID | GSM Frequency | BSIC | GSM MSC ID | MSC Revision |
|---|---|---|---|---|---|---|---|
| 235 | 42 | True | 674 | 870.25 | 12 | 12 | True |
| 237 | 12 | False | N/A | N/A | N/A | N/A | N/A |

When the MSN notices that the serving cell is marked as a Border cell, the Inter Technology hard handoff procedure is triggered.

HHO Execution

Handling GSM Protocol Layers

The GSM protocol stack performs HANDOVER procedures at the RR layer while keeping the protocol layers (RR, MM and CM) integrity. In GSM these layers exist on the Mobile side and on the anchor MSC.

The CM layer can be further divided into the CC, SS and SMS sub-layers. When performing an Inter Technology Hard Handoff to GSM, there is a need to instantiate the RR, MM and CM entities both at the Mobile and at the MSN, who servers in this case as the anchor MSC. Those entities should be created in their active state with all relevant information required to maintain the GSM active mode.

The following paragraphs address the creation of these entities as part of the Inter Technology Hard Handoff procedure.

The RR Layer

On the network side, the RR layer is a native GSM RR layer and shall comply with GSM specifications.

On the Mobile side, the RR layer shall be kick-started into DEDICATED mode without performing any IDLE procedures. All parameters related to IDLE processing shall be initialized accordingly. The RR layer shall then perform the Handover procedure with the new GSM destination cell according to GSM specifications (mainly GSM 04.18 section 3.4.4).

The GSM layers below the RR layer are native GSM layers and shall comply with the GSM specifications. The establishment of the physical channels shall follow the non-synchronized cell case.

The network sets the ciphering mode as part of the Inter Technology HHO procedure. To allow it, the optional cipher mode setting IE of the HANDOVER COMMAND message becomes a mandatory IE for Inter Technology HHO. The network shall determine that this is a non-synchronized handover.

The MM Layer

During HHO, the MM layer in both the Mobile side and the MSN side shall be initialized into the MM CONNECTION ACTIVE state of the GSM MM protocol. According to GSM 04.08, the MM layer is in the MM CONNECTION ACTIVE state when the MM layer has an RR connection to its peer entity on the network side. One or more MM connections are active. In GSM, the MM layer enters the MM CONNECTION ACTIVE state after performing a sequence of state transitions, starting from the NULL state. During these state transitions a list of MM parameters are initialized with values received from the primitives that are driving the transitions. In the Inter Technology HHO procedure the MM layer is kick-started into the MM CONNECTION ACTIVE state and thus information contained in the above primitives shall be initialized by the MM layer using other means. The remaining of this section lists the parameters to be initialized and specifies the initialization values.

All the system information shall be deleted.

Number Of MM Connection shall be initialized according to the number of existing CM transactions. For a single voice call HHO, the number of connections shall be initialized to 1.

Ciphering key shall be initialized with a value from the SIM.

Ciphering key sequence number shall be initialized with a value from the SIM.

Channel mode shall be initialized with a value from the HO COMMAND message, from the Mode of the first channel (Channel set 1) IE. This IE is mandatory in HHO from GSM1x, although it is optional in GSM.

Channel type shall be initialized with a value from the HO COMMAND message, from the Description of the first channel, after time IE.

Subchannel shall be initialized with a value from the HO COMMAND message, from the Description of the first channel, after time IE.

CM service type shall be initialized as follows:

For MO calls shall be set to 0 0 0 1 for a voice call and to 0 0 1 0 for Emergency call.

For MT call shall not be used.

Mobile station classmark. The GSM classmark is provisioned also in GSM1x mode. The classmark is not part of the HHO procedure (passed in the authentication procedure).

Mobile identity shall be derived from the mobile identity of the GSM1x call, as follows:

If the GSM1x call was initiated using IMSI, the Mobile identity type shall be IMSI. The value shall be derived from EFimsi from the SIM.

For emergency call the Mobile identity shall be initialized. (One alternative is to use the IMEI. Need to find a way to get the IMEI at the network side. Not sure if Mobile identity is even required during and after the handover.)

In all cases TMSI is not used.

The update status of the mobile station shall be marked as not-updated. Alternatively, the mobile shall write a LAI value to the SIM that identifies the location area of the GSM1x original cell.

The "forbidden location areas for roaming", as well as the list of "forbidden location areas for regional provision of service" shall be deleted as part of HHO. (Because in GSM they are deleted upon power down, and being out of GSM mode (i.e. in GSM1x) resembles GSM power down).

The CM Layer

The GSM CM layer consists of 3 components: CC, SS and SMS. The context of all 3 components has to be initialized during HHO. In the current version of this document only the CC is covered.

The CC Sub-Layer

The CC component of the CM sublayer is responsible for call control and for call related supplementary services. In the current version of this document, only a single instance of the CC is supported; also, the call related SS are not supported, apart from several future hooks.

During HHO, the CC sublayer in both the Mobile side and the MSN side shall be initialized into the ACTIVE (U10/N10) state of the GSM CC protocol. According to GSM 04.08, the CC sublayer is in the ACTIVE state when: a) for a Mobile terminating call the MS has answered the call and b) for a Mobile originating call when the MS has received an indication that the remote user has answered the call. During HHO, all the auxiliary state machines of the ACTIVE state shall be initialized into their IDLE state (e.g. the IDLE state in the auxiliary state machine for hold and retrieve SS). In GSM, the CC sublayer enters the ACTIVE state after performing a sequence of state transitions, starting from the NULL state. During these state transitions a list of CC parameters are initialized with values received from the primitives that are driving the transitions. In the HHO procedure the CC sublayer is kick-started into the ACTIVE state and thus information contained in the above primitives shall be initialized by the CC sublayer using other means. The remaining of this section lists the parameters to be initialized and specifies the initialization values.

Transaction ID shall be initialized according to the TI value that the call had in the GSM1× mode. TI allocation for calls in GSM1× mode is defined in GSM1× Supplementary Services, 80-31493-1.

Bearer capability 1 shall be set as follows:

IEI: 04H

Length: 01H

Value: A0H

Bearer capability 2 is not relevant for this phase (not used for a voice call).

Calling party BCD number shall be initialized according to the Calling party BCD number that the call had in the GSM1× mode.

Calling party subaddress shall be initialized according to the Calling party subaddress that the call had in the GSM1× mode.

Called party BCD number shall be initialized according to the Called party BCD number that the call had in the GSM1× mode.

Called party subaddress shall be initialized according to the Called party subaddress that the call had in the GSM1× mode.

Redirecting party BCD number is not supported in this phase. Redirecting party sub-address is not supported in this phase.

Low layer compatibility I is not supported in this phase (not used for a voice call).

Low layer compatibility II is not supported in this phase (not used for a voice call).

High layer compatibility I is not supported in this phase (not used for a voice call).

High layer compatibility II is not supported in this phase (not used for a voice call).

CC Capabilities shall be initialized.

CM service type shall be initialized as in MM layer.

Ciphering key sequence number shall be read from the IM. This sets a requirement for the GSM1× MS to store this value after each auethntication procedure that was performed on the GSM1× mode.

Mobile station classmark shall be based on the provisioning information.

Mobile identity shall be initialized as in MM layer.

Channel mode shall be initialized as in MM layer.

Channel type shall be initialized as in MM layer.

Subchannel shall be initialized as in MM layer.

Handling SMS (SMS Sub-Layer)

Handling SMS during HHO is not supported by this version of the document.

Note: SMS messages in GSM uses SAPI=3. According to GSM 04.18, section 3.1.4.2, for SAPIs other than 0, the data link procedures do not provide any guarantee against message loss or duplication.

Handling Supplementary Services (SS Sub-Layer)

The SS component of the CM sublayer is responsible for the management of supplementary services. Handling SS management during HHO is not supported by this version of the document.

Handling Layer 2 Messages

In GSM all signaling messages coming from different protocol layers (CM (CC, SS, and SMS), MM and RR) are handled by a single queue at layer 2. The communication with the network is done using stop-and-wait approach. A message is sent to the network and the next message is transmitted only after the first message reception was acknowledged by the network. In this approach a toggle bit is used for duplication avoidance. If a message is received at the network with the same value of the toggle bit it shall be discarded (message is a duplicate). However, an acknowledge message shall still be forwarded to the Mobile.

In GSM1× only the SSM (Supplementary Services Management), SSO (Supplementary Services Operation) and SMS communication integrity should be maintained during the Inter Technology HHO Procedure. Upon the reception of the Inter Technology HHO Command the Mobile shall suspend the transmission of those messages and shall maintain the message queue and status of the latest transmission. When the Inter Technology HHO Procedure is terminated and the Mobile has resume services on the GSM network, transmission of queued messages should be resumed. If there is an outstanding message (message that was not acknowledged) it should be resend.

Handling Voice Services

GSM1× and GSM use different vocoders. Hence the MSN should specify the required voice services as part HANDOVER REQUEST message being forwarded to the GSM MSC. It is suggested to use EVRC as the requested service.

The Basic Inter Technology Hard Handoff

This type of handoff is carried between the GSM1× MSN and a GSM MSC. The GSM1× MSN serves as the anchor MSN. Information provided by the GSM1× MSN to the MS is also useable if the gated transmission or dual receive chain methods are employed.

Successful Operation

Figure 9:
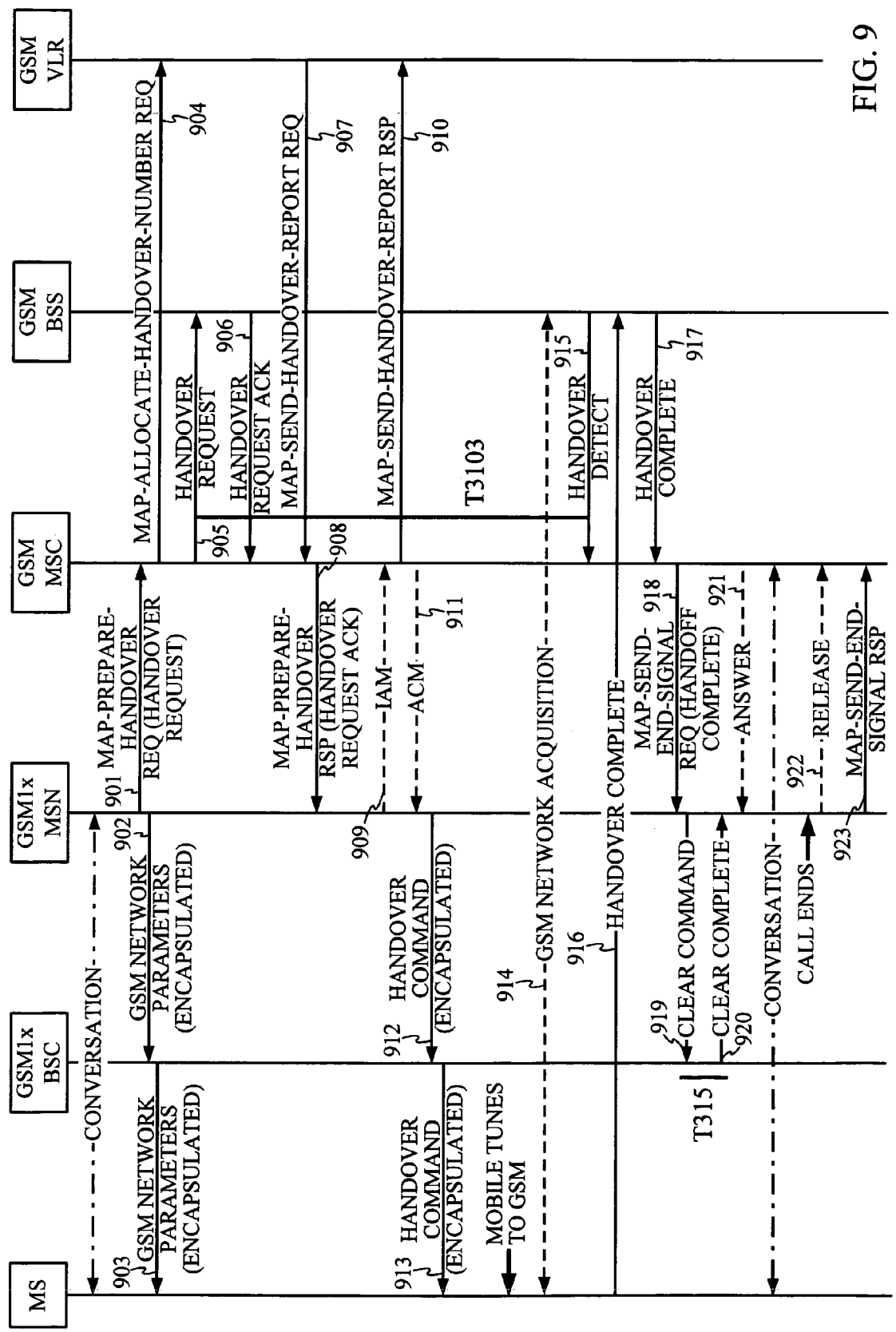
FIG. 9 shows a GSM1x to GSM handoff message flow diagram in accordance with an embodiment.

FIG. 9 shows a GSM1× to GSM handoff message flow diagram in accordance with an embodiment. FIG. 9 depicts the signaling for a successful Basic Inter Technology hard handoff requiring a circuit connection between the GSM1× MSN and the GSM MSC.

In step 901, the GSM1× MSN initiates the handoff procedure. When the GSM1× MSN decides that all criteria to perform an Inter Technology hard handoff to the GSM network are met, then the GSM1× MSN shall construct a candidate target cell list. After the GSM1× MSN has established a candidate target cell list, it shall forward a MAP Prepare Handover Request message to the target GSM MSC containing a complete Handover Request message.

In step 902, the GSM1× MSN forwards the GSM network parameters stored in its Configuration table to the GSM1× BSC. This message is forwarded using the GSM1× Signaling Tunnel mechanism.

In step 903, the GSM1× BSC forwards the GSM network parameters received by the GSM1× MSN to the MS. This message is forwarded using the GSM1× Signaling Tunnel mechanism.

In step 904, the GSM MSC requests a Handover Number from its associated VLR. The Handover Number is used for routing the connection of the call from the GSM1× MSN to the GSM MSC.

In step 905, upon receiving a Handover Required message, the target GSM MSC should forward a Handover Request message to the target GSM BSC. In parallel to forwarding the Handover Required message, the GSM MSC starts timer T3103.

In step 906, if radio resources are available at the target GSM BSC, then this will be reflected back to the GSM MSC in a Handover Request Acknowledge message. The Handover Request Acknowledge message sent by the new GSM BSC shall contain the radio interface message Handover Command within its "Layer 3 Information" information element.

In step 907, the local VLR returns the assigned Handover Number to the GSM MSC.

In step 908, upon receiving the Handover Number, the GSM MSC returns a MAP-Prepare-Handover response to the GSM1× MSN, containing the complete Handoff Request Ack message received from the GSM BSC.

In step 909, the GSM1× MSN sends an SS7 IAM to initiate a circuit between the GSM1× MSN and the GSM MSC.

In step 910, upon receiving the call from the GSM1× MSN using the Handover Number, the GSM MSC releases the Handover Number in the VLR by sending a MAP-Send-Handover-Report response.

In step 911, the GSM MSC signals to the GSM1× MSN that a circuit for the call has been reserved.

In step 912, the GSM1× MSN uses the content of the Handoff Request Ack message to form a GSM RR-Layer 3 Handover Command. This message should be forwarded to the old GSM1× BSC. However, the IOS format of the Handoff Command has no accommodation for the GSM Handover Command. Hence, this message shall be forwarded to the old GSM1× BSC using the GSM1× Tunneling mechanism (over ADDS).

In step 913, the old GSM1× BSC shall then forward the encapsulation of the GSM Handover Command to the MS.

In step 914, the MS extracts the GSM Handover Command, and is ready to start performing the handoff. First, the MS acquires the FCCH and SCH of the target GSM cell (see Note below). Thereafter, the MS tunes to the target TCH, as defined in the GSM Handover Command.

NOTE: In an embodiment, when acquiring the GSM network, it takes the MS 27.5 milliseconds on average (110 milliseconds maximum) to acquire the FCCH. An additional 4.6 milliseconds are required to acquire the SCH.

In step 915, the new GSM BSC sends a Handover Detect message to the GSM MSC.

In step 916, when the MS is successfully in communication with the network, (in other words, the RR message Handover Complete has been received from the MS), then the new GSM BSC immediately sends a Handover Complete message to the GSM MSC.

In step 917, the GSM MSC sends a MAP Send End Signal Request message to the GSM1× MSN, which contains the complete Handoff Complete message.

In step 918, upon receiving the Handover Complete message from the GSM MSC, the GSM1× MSN sends a Clear Command message to the GSM1× BSC, and starts timer T315.

In step 919, when the GSM1× BSC receives the Clear Command message from the GSM1× MSN, it clears all MS-allocated resources, and returns a Clear Complete message to the GSM1× MSN.

In step 920, upon receiving the Clear Complete message from the GSM1× BSC, the GSM1× MSN resets timer T315.

In step 921, upon receiving the Handoff Complete message from the GSM BSC, the GSM MSC generates an SS7 answer signal toward the GSM1× MSN.

In step 922, upon termination of the call (either by the MS or by the other party subscriber), the GSM1× MSN clears the circuit between itself and the GSM MSC.

In step 923, the GSM1× MSN sends a MAP Send End Signal Response message to the GSM MSC to release the MAP resources in the GSM MSC.

The common implementation of a GSM protocol stack does not support handoff into GSM from a none-GSM/UMTS technology such as GSM1× while the MS is in dedicated mode. Hence, changes are required in the GSM protocol stack on the MS side to support the above procedure.

The procedure defined above has one open issue. The GSM1× BSC is expected to send out a Handoff Commenced message after a hard handoff command is sent to the MS. However, the BSC has no notion of the hard handoff command being forwarded as an encapsulated message to the MS. The proposed solution is based on sending a dummy Handoff Command from CDMA to AMPS. The GSM1× BSC shall forward this message to the MS, which should ignore it. However, on the GSM1× BSC side, this message shall be used to properly handle Timer T7 and T8. This message shall also be used as a trigger to send out to the GSM1× MSN a Handoff Commenced message.

In an embodiment, the earliest point during call setup that an Inter Technology HHO is allowed is immediately after the service negotiation procedure is complete. In another embodiment, this requirement is relaxed and the Inter Technology HHO procedure is supported as soon as the traffic channel is set-up.

Timers

Timers are involved in the Handoff procedure:
GSM1× Side Timers
The following timers are involved in the GSM1× side of the Handoff procedure:
Timer T7
Timer T315
Time T9
Timer T11
Timer T7 characteristics are described in table 12.

TABLE 12

| Timer Characteristic | Description |
|---|---|
| Owner | Source BSC (GSM1x) |
| Start | The timer T7 is started by the source BSC (GSM1x) when sending the Handoff Required message to the |

TABLE 12-continued

| Timer Characteristic | Description |
| --- | --- |
|  | MSN. Therefore, the timer represents the time between successive handoff attempts for the same MS connection. |
| Stop | Timer T7 is stopped when a Handoff Command message or a Handoff Required Reject message is received. |
| Expiration | The source BSC resends the Handoff Required message to the MSN, and then resets the timer. |
| Value | It is recommended that this timer value be long enough to cover all message exchanges with potential targets, and the maximum time to send all transmissions of the Handoff Command message (see timer T8). The default value is 10 seconds, and can be up to 255 seconds. |

Timer T315 characteristics are described in table 13.

TABLE 13

| Timer Characteristic | Description |
| --- | --- |
| Owner | Source MSN (GSM1x) |
| Start | The timer T315 is started when the Clear Command message is sent to the GSM1x BSC. |
| Stop | The timer T315 is stopped when the Clear Complete message is received from the GSM1x BSC. |
| Value | The default value is 5 seconds, and can be up to 99 seconds. |

The timer T9 has no relevancy here. Its functionality is related to the target BSC, and in this case is covered by the GSM side.

The timer T11 has no relevancy here. Its functionality is related to the target BSC, and in this case is covered by the GSM side.

GSM Side Timers

The following timers are involved in the GSM side of the Handoff procedure:

Timer T3124

Timer T3105

Timer T3103

Timer T3124 characteristics are described in table 14.

TABLE 14

| Timer Characteristic | Description |
| --- | --- |
| Owner | The MS |
| Start | The timer T3124 is started when the Handover Access message is sent the first time. It is used in the seizure procedure during a handover, when the two cells are not synchronized. Its purpose is to detect lack of answer from the network to the special signal. |
| Stop | When the MS receives a Physical Information message. |
| Expiration | If timer T3124 expires (only in the non-synchronized case), or if a lower layer failure happens on the new GSM channel before the Handover Complete message has been sent, the MS deactivates the new GSM channels and attempts to reactivate the old GSM1x channels. It then sends a Handover Failure message, and resumes normal operation as if no handoff attempt had occurred. The operational parameters when returning on the old GSM1x channel are those applied before the Handover Command message was received. |
| Value | This timer is set to 675 ms if the channel type of the channel allocated in the Handover Command is SDCCH (+SACCH). Otherwise, its value is set to 320 ms. |

Timer T3105 Characteristics are described in table 15.

TABLE 15

| Timer Characteristic | Description |
| --- | --- |
| Owner | GSM BSC |
| Start | The timer T3105 is started when the new GSM BSC starts to send the Physical Information message to the MS. |
| Stop | The time T3105 is normally stopped when the new GSM BSC receives correctly decoded frames from the MS. |
| Expiration | If timer T3105 expires, then the network repeats the Physical Information message and restarts timer T3105. The maximum number of repetitions is configurable. |
| Value | Network dependent |

Timer T3103 characteristics are described in table 16.

TABLE 16

| Timer Characteristic | Description |
| --- | --- |
| Owner | GSM MSC |
| Start | The timer T3103 (the equivalence of T9) is started when the GSM MSC sends the Handover Command message. |
| Stop | The timer T3103 is normally stopped when the MS has correctly seized the new GSM channel. Its purpose is to keep the old channels sufficiently long for the MS to be able to return to them, and to release the channels if the MS is lost. |
| Expiration | If timer T3103 expires before the Handover Complete message is received on the new GSM channels, or a Handover Failure message is received on the old GSM1x channels, or the MS has reestablished the call, then the old GSM1x channels are released. If neither a correctly layer 2 frame nor a correctly TCH frame have been received from the mobile station on the new GSM channel, the newly allocated channels are released. |
| Value | Network dependent. It should be higher than the maximum transmission time of the Handover Command, plus the value of T3124 and the maximum duration of an attempt to establish a data link in multi-frame mode. |

Abnormal Cases

MAP Protocol Errors

Following the reception of the MAP-Prepare-Handover request at the GSM MSC, MAP protocol errors at the GSM MSC may occur as a result of the following:

Detected user errors

Provider errors (component rejection, MAP dialogue abortion)

Unsuccessful Handover Number allocation

FIG. 10 depicts a call flow diagram for MAP protocol errors in accordance with an embodiment. FIG. 10 shows an MS 1002, a GSM1x BSC 1004, a GSM1x MSN 1006, a GSM MSC 1008, a GSM BSS 1010, and a GSM VLR 1012. A conversation 1016 is shown between the MS 1002 and the GSM1x MSN 1006. A MAP-Prepare-Handover Req (Handover Request) is sent 1021 from the GSM1x MSN 1006 to the GSM MSC 1008. A MAP-Prepare-Handover Rsp (Provider Error or User Error) or MAP-P-ABORT or MAP-U-ABORT or MAP-Close is sent 1022 from the GSM MSC 1008 to the GSM1x MSN 1006.

Upon reception of the MAP error message the GSM1x MSN can attempt another request or let the call drop.

Radio Resource Allocation Failure

If the target BSC (GSM BSC) is unable to allocate resources, then it shall issue a Handover Failure message and forward it to the GSM MSC.

The GSM MSC shall forward the Handover Failure message to the GSM1x MSN. The GSM1x MSN can initiate another Handoff Required message with a different target BSC (GSM BSC), or let the call drop. If the MSN decides not to initiate another Handoff Required message it should act as follows:

If the MSN has initiated the Handoff Required message nothing else should be done.

If the BSC has initiated the Handoff Required message, the MSN shall send a Handoff Required Reject message indicating that the requested handoff cannot be performed. Upon receiving a Handoff Required Reject message, the CDMA BSC (GSM1x BSC) should reset Timer T7 depending on the device initiating the process.

FIG. 11 depicts a call flow diagram for failing to allocate radio resources at the GSM MSC. FIG. 11 shows an MS 1102, a GSM1x BSC 1104, a GSM1x MSN 1106, a GSM MSC 1108, a GSM BSS 1110, and a GSM VLR 1112. A conversation 1116 is shown between the MS 1102 and the GSM1x MSN 1106.

In step 1121, a MAP-Prepare-Handover Req (Handover Request) is sent 1121 from the GSM1x MSN 1106 to the GSM MSC 1108. In step 1122, a GSM Network Parameters (encapsulated) message is sent from the GSM1x MSN 1106 to the GSM1x BSC 1104. In step 1123, a GSM Network Parameters (encapsulated) message is sent from the GSM1x BSC 1104 to the MS 1102. In step 1124, a MAP-Allocate-Handover-Number-Req is sent from the GSM MSC 1108 to the GSM VLR 1112. In step 1125, a Handover Request is sent from the GSM MSC 1108 to the GSM BSS 1110. In step 1126, a Handover Failure is sent from the GSM BSS 1110 to the GSM MSC 1108. In step 1127, a MAP-Send-Handover-Report Req is sent from the GSM VLR 1112 to the GSM MSC 1108. In step 1128, a MAP-Prepare-Handover Rsp (Handoff Failure) is sent from the GSM MSC 1108 to the GSM1x MSN 1106.

Unsuccessful Handover Execution

If the MS fails to handoff to the GSM network, the call shall be dropped. In this case, the allocated resources on the target BSC (GSM BSC) shall be released. This is controlled by timer T3105 at the target BSC (GSM BSC).

Figure 12:
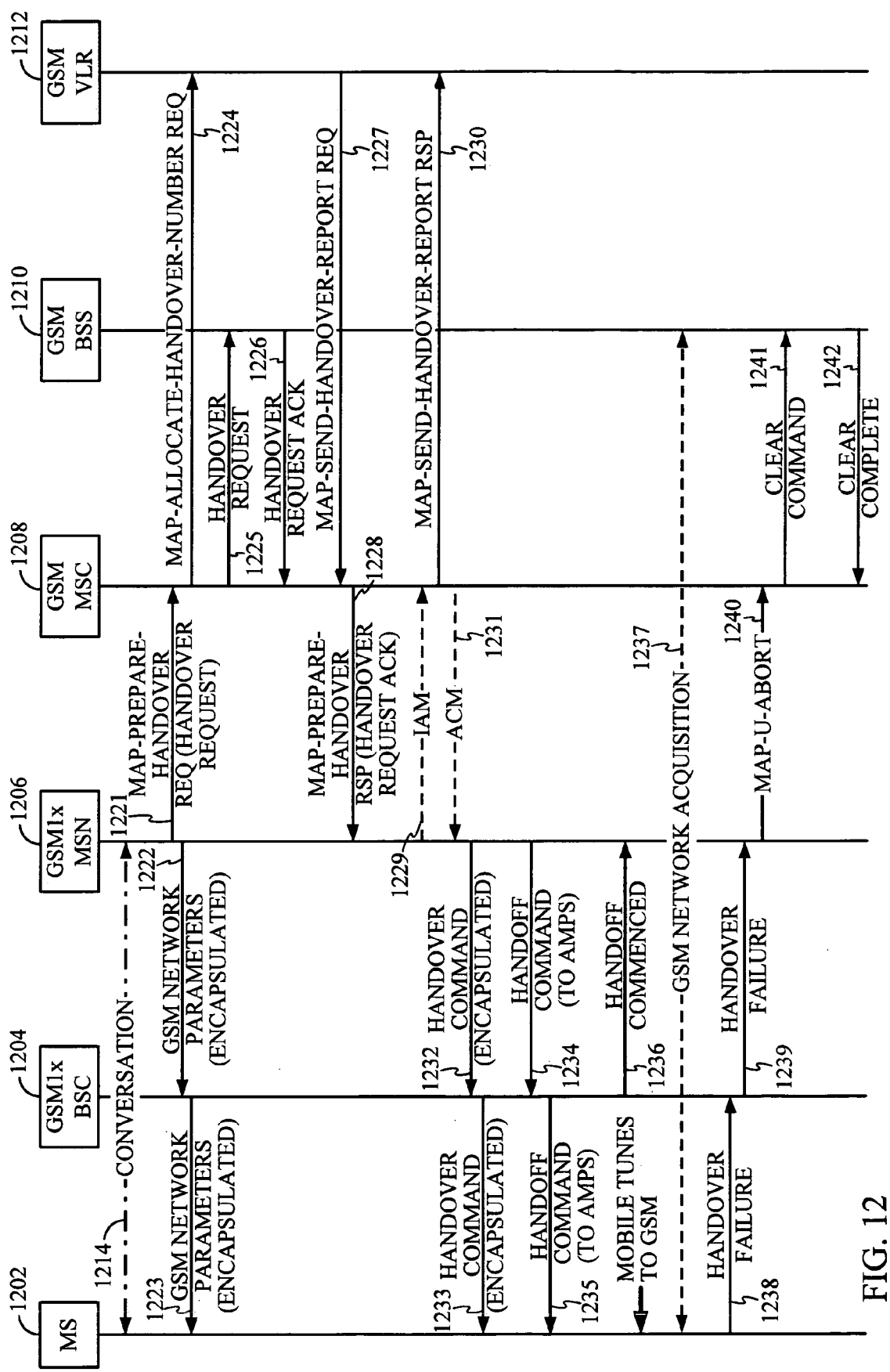
FIG. 12 depicts the call flow diagram for unsuccessful handover execution in accordance with an embodiment.

FIG. 12 depicts the call flow diagram for unsuccessful handover execution. FIG. 12 shows an MS 1202, a GSM1x BSC 1204, a GSM1x MSN 1206, a GSM MSC 1208, a GSM BSS 1210, and a GSM VLR 1212. A conversation 1216 is shown between the MS 1202 and the GSM1x MSN 1206.

In step 1221, a MAP-Prepare-Handover Req (Handover Request) is sent 1221 from the GSM1x MSN 1206 to the GSM MSC 1208. In step 1222, a GSM Network Parameters (encapsulated) message is sent from the GSM1x MSN 1206 to the GSM1x BSC 1204. In step 1223, a GSM Network Parameters (encapsulated) message is sent from the GSM1x BSC 1204 to the MS 1202. In step 1224, a MAP-Allocate-Handover-Number-Req is sent from the GSM MSC 1208 to the GSM VLR 1212.

In step 1225, a Handover Request is sent from the GSM MSC 1208 to the GSM BSS 1210. In step 1226, a Handover Request ACK is sent from the GSM BSS 1210 to the GSM MSC 1208. In step 1227, a MAP-Send-Handover-Report Req is sent from the GSM VLR 1212 to the GSM MSC 1208. In step 1228, a MAP-Prepare-Handover Rsp (Handoff Failure) is sent from the GSM MSC 1208 to the GSM1x MSN 1206.

In step 1229, an IAM is sent from the GSM1x 1206 to the GSM MSC 1208. In step 1230, a MAP-Send-Handover-Report Rsp is sent from the GSM MSC 1208 to the GSM VLR 1212. In step 1231, an ACM is sent from the GSM MSC 1208 to the GSM1x MSN 1206. In step 1232, a Handover Command (encapsulated) is sent from the GSM1x MSN 1206 to the GSM1x BSC 1204. In step 1233, a Handover Command (encapsulated) is sent from the GSM1x BSC 1204 to the MS 1202.

In step 1234, a Handoff Command (to AMPS) is sent from the GSM1x MSN 1206 to the GSM1x BSC 1204. In step 1235, a Handoff Command (to AMPS) is sent from the GSM1x BSC 1204 to the MS 1202. In step 1236, a Handoff Commenced message is sent form the GSM1x BSC 1204 to the GSM1x MSN 1206. In step 1237, a GSM Network Acquisition relationship is made between the MS 1202 and the GSM BSS 1210. In step 1238, a Handover Failure is sent from the MS 1202 to the GSM1x BSC 1204. In step 1239, a Handover Failure is sent from the GSM1x BSC 1204 to the GSM1x MSN 1206. In step 1240, a MAP-U-ABORT is sent from the GSM1x MSN 1206. In step 1241, a Clear Command is sent from the GSM MSC 1208 to the GSM BSS 1210. In step 1242, a Clear Complete is sent from the GSM MSC 1208 to the GSM BSS 1210.

Handoff Synchronization

In a normal GSM handoff, there are four methods by which the MS can synchronize its communication with the new BSC to which it is handed off, in accordance with an embodiment. Table 17 shows Handoff Synchronization Methods.

TABLE 17

| Synchronization Method | Description |
| --- | --- |
| Synchronized | Requires that the two BTSs (old and new) be synchronized, and that the real GSM time difference between them be zero. |
| Pre-Synchronized | Used primarily for handoff to/from a micro cell with a small coverage area. Therefore, the distance of the MS from the BTS is assumed to be small. |
| Non-Synchronized | No synchronization between the BTSs is assumed. |
| Pseudo-Synchronized | Requires that the two BTSs (old and new) be synchronized, and that the real GSM time difference between them be known and provided to the MS. |

In an embodiment, the decision on which synchronization method to use during handoff is taken by a new GSM BSC. However, in CDMA (GSM1x) to GSM handoff, Non-Synchronized is the only method that will be chosen, and the only method that can be used. Therefore, in order to perform CDMA (GSM1x) to GSM handover, the MS needs to support the Non-Synchronized handover method.

The reasons that only Non-Synchronized can be used are the following:

The GSM1x (CDMA) cell does not have a valid "local GSM time", and therefore no valid RTD or OTD can be measured between it and the new GSM cell. As such, the MS cannot calculate the TA needed in order to synchronize with the new BSC (GSM BSC) and can, therefore, only use the Non-Synchronized method.

The GSM1x (CDMA) cell cannot be listed as a valid adjacent neighbor cell of the GSM cell, mainly because it cannot act as a valid GSM cell to which a normal GSM MS can listen. As such, any handoff involving the GSM1x (CDMA) cell will be regarded by the new BSC (GSM BSC) as a handoff from an unknown adjacent cell. In such cases, the new BSC (GSM BSC) will have to choose the Non-Synchronized method.

Even in the case that the GSM1x (CDMA) cell is listed in the new BSC (GSM BSC), that listing can be configured such that the new BSC knows to always use the Non-Synchronized method when receiving a handover from the GSM1x (CDMA) BTS.

Handoff Detection Methods

This section provides a detailed description of the hard handoff procedure from GSM1x to GSM. It mainly covers ideas that were ultimately not adopted for the final system design.

Figure 13:
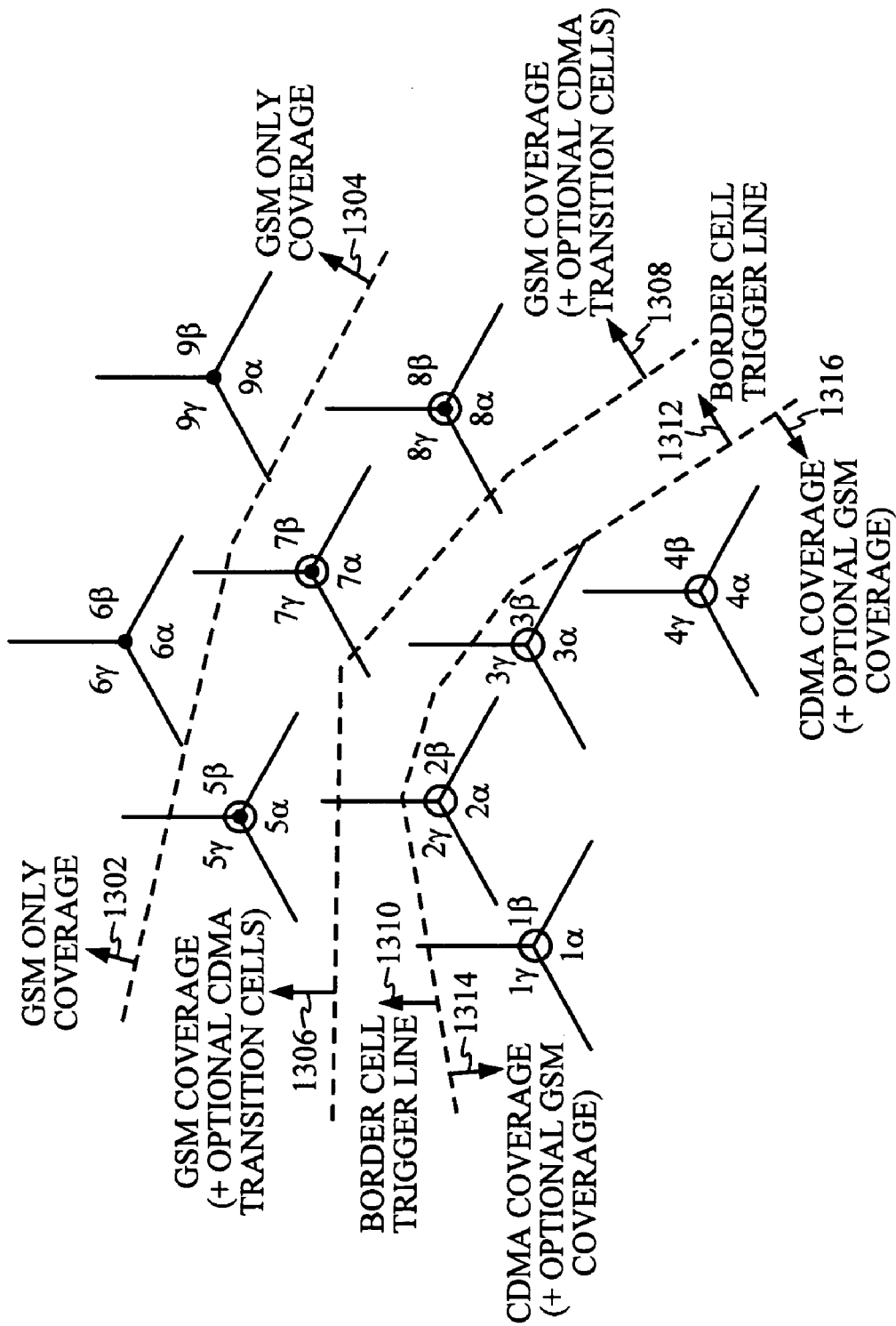
FIG. 13 shows an example of an area covered by CDMA (GSM1x) and GSM in accordance with an embodiment.
Figure 14:
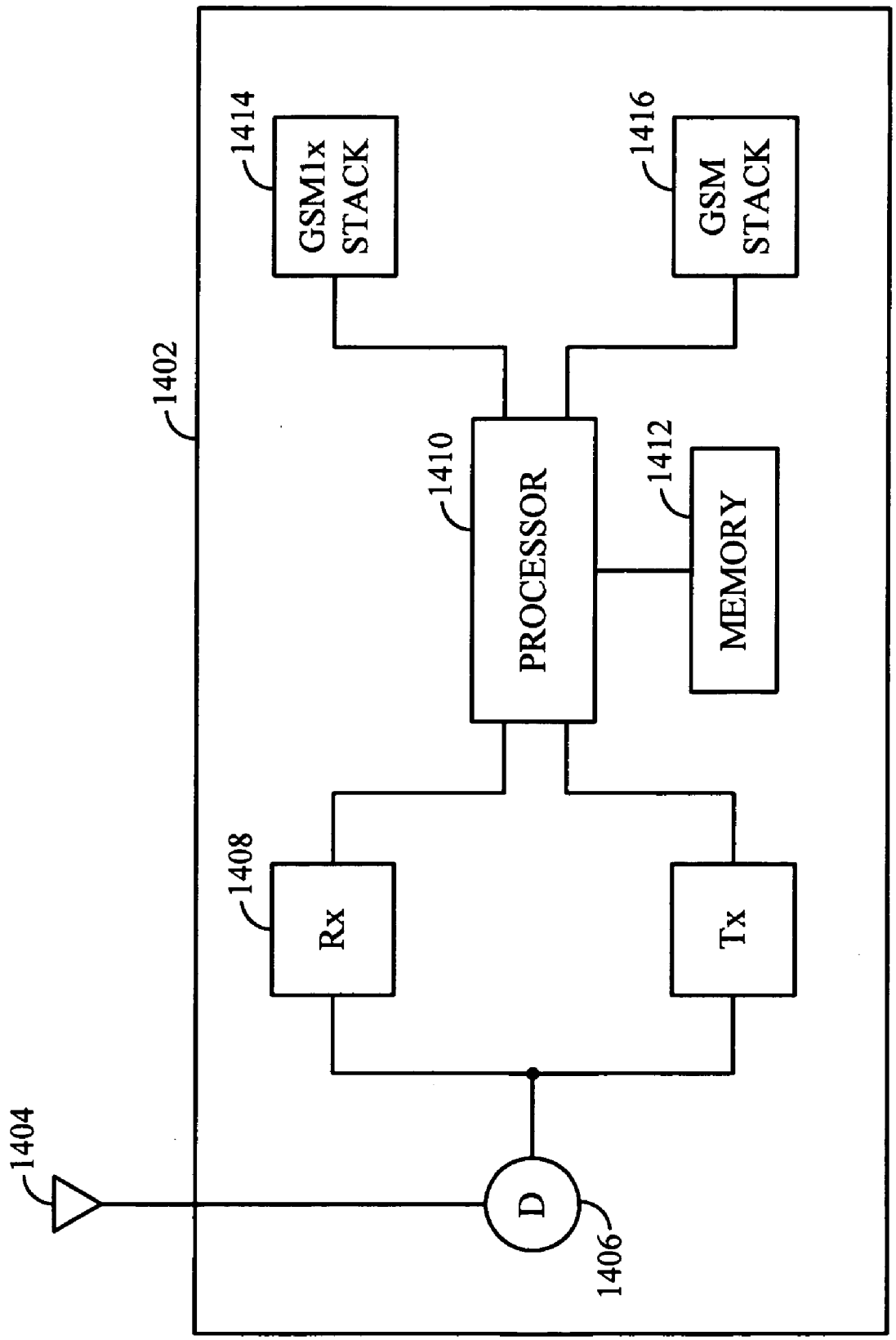
FIG. 14 illustrates a block diagram of receiver/transmitter chain coupled to GSM1x and GSM stacks in accordance with an embodiment.

FIG. 13 shows border cells and pilot beacons. GSM only coverage 1302, 1304, GSM coverage plus optional CDMA transition cells 1306, 1308, border cell trigger lines 1310, 1312, and CDMA coverage plus optional GSM coverage 1314, 1316 is shown To be able to perform inter-technology handoff (CDMA to GSM), there are several detection methods. FIG. 13 shows an example of an area covered by CDMA (GSM1x) and GSM in accordance with an embodiment. This example is used in the text explaining the handoff trigger methods. Cells 1 through 4 are CDMA (GSM1x) cells, while cells 5 through 9 are GSM cells. The following text explains the possible handoff trigger methods using this example.

For all detection methods, extra information related to the GSM1x network topology is held at the GSM1x MSN. For each cell in the network, all neighbor cells are listed. If these cells are GSM cells, than further information related to their FCCH and SCH frequency channel is also provided.

Pilot Beacon Units

Pilot Beacon units are stripped-down CDMA cells that transmit only the Pilot channel. They are physically collocated with GSM cells that border the GSM1x coverage area. In FIG. 13, cells 5, 7 and 8 contain Pilot Beacon units. From the MS point of view, Pilot Beacon units are regular CDMA neighbor cells that belong to another CDMA system. The MS measures their strength, and reports back to the GSM1x BSC when the proper threshold conditions are met.

If the MS reports back a Pilot Beacon that is strong enough to be added to its active set, and if the MS's reference pilot is of a GSM1x cell that is a geographical neighbor of the reported Pilot Beacon, then the GSM1x BSC assumes that the MS is approaching the border of the GSM1x coverage area. The GSM1x BSC then triggers a CDMA hard handoff procedure, sending a request to the GSM1x MSN. This request arrives at the GSM1x MSN. The GSM1x MSN, knowing the GSM1x network topology, starts an Inter-Technology handoff procedure to the GSM cell collocated with the Pilot Beacon, which was reported originally as the designated cell for handoff.

The Pilot Beacon method is reliable and relatively easy to test and implement. However, it has several drawbacks:

There is a need to update the Neighbor List table when the GSM1x network is initially deployed, and during each network topology change.

It requires additional hardware (Pilot Beacon units) and additional installation.

The MS has no awareness of the GSM RAN until it is instructed to perform the handoff. During the handoff procedure, the MS has to acquire the GSM FCCH and SCH before it can enter Dedicated mode on the GSM RAN.

Border Cells

The GSM1x MSN is configured with a list of sectors along the border of the GSM1x coverage area, each with its bordering GSM cell(s). In the example above, Sectors 2γ, 2β, 3β and 4β are configured in the GSM1x MSN as Border cells. When an MS enters such a sector the MSN behavior is similar to the Pilot Beacon case (see 0).

The main advantage of the Border cell method is that it does not require any additional hardware. However, it has several drawbacks:

There is a need to update the Neighbor List table when the GSM1x network is initially deployed, and during each network topology change.

The MS has no awareness of the GSM RAN until it is instructed to perform the handoff. During the handoff procedure, the MS has to acquire the GSM FCCH and SCH before it can enter Dedicated mode on the GSM RAN.

Transition Cells

Transition cells are low-capacity GSM1x cells that, similarly to Pilot Beacon units, overlap the GSM coverage area. In the example, GSM cells 5,7 and 8 may have GSM1x Transition cells collocated with them. When an MS is soft-handed (CDMA-wise) to a Transition cell, the GSM1x MSN immediately initiates an Inter-Technology hard handoff to the GSM network.

The advantages of the Transition cells method are very similar to those of the Pilot Beacon method. In addition, this method is more tolerant to possible delays from handoff trigger to handoff execution. However, it has several drawbacks:

There is a need to update the Neighbor List table when the GSM1x network is initially deployed, and during each network topology change.

This method is based on using redundant infrastructure equipment. The Transition cell is actually a buffer to enable smooth transmission between the GSM1x network and the GSM network.

The MS has no awareness of the GSM RAN until it is instructed to perform the handoff. During the handoff procedure, the MS has to acquire the GSM FCCH and SCH before it can enter Dedicated mode on the GSM RAN.

Modified Candidate Frequency Search

In this method, the MS stops its transmission in predefined time intervals, and tunes its RF chain to receive and decode the GSM network cells and report their strengths to the GSM1x MSN. This method has several drawbacks:

Interrupting the transmission on the Dedicated channel shall impact the voice quality. Therefore, the duration of the time period the MS does not transmit/receive should be minimal to maintain adequate quality of services.

It requires fast tuning of the RF chain back and forth between two frequencies; being able to receive and decode enough information from the other technology.

Dual RX Chain

In this method, the MS has a second RX chain that can be turned to receive and decode the GSM network cells and report their strengths to the GSM1x RAN. Using this method, the call can proceed without any interruption on the GSM1x network while the MS also monitors the GSM network. This method has several drawbacks:

Need for extra hardware to monitor the GSM network.
Power consumption is higher due to the second RX chain.
Need to run two protocol stacks (GSM1x and GSM) in parallel.

Choosing a Handoff Detection Method

Several detection technologies were presented in the previous section:

Pilot Beacon
Border Cells (Location-Based)
Transition Cells
Gated Transmission

Dual RX chain

The two MS-assisted methods, Gated Transmission and Dual RX Chain, are not an option to the first product release due to the limitations of the target MSM (MSM-6300). Furthermore, the level of support required on the RAN side (CDMA) is not guaranteed, and the level of MS software complexity (both CDMA and GSM) is relatively high. The other three methods are network-initiated.

The two technologies based on using Pilot Beacon units or Transition Cells involves high deployment complexity and cost, although they use basic CDMA RAN features. The level of operation complexity related to the redeployment of these units every time the network topology changes works against them.

The only relevant technology left is based on using the Border Cells (Location Based) approach. This assumes that the GSM1x MSN decision criteria for initiating an Inter-System hard handoff takes into consideration the distance between the MS and the servicing cell. This method requires using a gpsOne technology at the MS, and control over the handoff procedure at the GSM1x MSN level.

Therefore, the design further defined in this document is based on using Border Cells as the handoff detection technology. The same system design can be applied to Pilot Beacon units or Transition Cells with very minimal modifications.

While the particular SYSTEM AND METHOD FOR GSM HARD HANDOFF as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

Method steps can be interchanged without departing from the scope of the invention.

What is claimed is:

1. A method of handoff from a CDMA network to a GSM network, comprising:
    determining a mobile is served by a CDMA border cell, the mobile including a GSM1x protocol stack for performing handoff procedures to a CDMA network, and a GSM protocol stack for performing handoff procedures to a GSM network;
    sending the mobile a list of candidate GSM cells after determining the mobile is served by a CDMA border cell;
    sending a Mobile Switching Node (MSN) a candidate frequency search response message after receiving the list of candidate GSM cells;
    sending the mobile a candidate frequency search control message indicating that the mobile measure a surrounding GSM network;
    measuring the surrounding GSM network;
    sending a report of the measurements to the MSN; and
    selecting a GSM cell for handoff based on the report.

2. The method of claim 1, further comprising sending a handoff message to the Mobile Switching Node (MSN).

3. The method of claim 1, further comprising sending a handover message to a GSM MSC corresponding to the selected GSM cell.

4. A Mobile Switching Node (MSN), comprising:
    means for determining a mobile is served by a CDMA border cell, the mobile including a GSM1x protocol stack for performing handoff procedures to a CDMA network, and a GSM protocol stack for performing handoff procedures to a GSM network;
    means for sending the mobile a list of candidate GSM cells after determining the mobile is served by a CDMA border cell;
    means for sending the mobile a candidate frequency search control message indicating that the mobile measure a surrounding GSM network; and
    means for selecting a GSM cell for handoff based on a report from a mobile of measurements of a mobile's surrounding GSM network.

5. A dual-mode mobile station, comprising:
    an antenna for receiving and transmitting signals;
    a duplexer coupled to a transmitter and a receiver for switching between a transmitter and receiver;
    a receiver coupled to the duplexer for receiving signals;
    a transmitter coupled to the duplexer for transmitting signals;
    a GSM1x protocol stack used for performing handoff procedures to a CDMA network;
    a GSM protocol stack used for performing handoff procedures to a GSM network; and
    a processor coupled to the GSM1x protocol stack and the GSM protocol stack for performing handoff between CDMA and GSM networks, the processor also coupled to the receiver and transmitter for receiving and transmitting signals, respectively.

6. Computer readable media embodying a program of instructions executable by a computer program to perform a method of handoff from a CDMA network to a GSM network, the method comprising:

determining a mobile is served by a CDMA border cell, the mobile including a GSM1x protocol stack for performing handoff procedures to a CDMA network, and a GSM protocol stack for performing handoff procedures to a GSM network;

sending the mobile a list of candidate GSM cells after determining the mobile is served by a CDMA border cell;

sending a Mobile Switching Node (MSN) a candidate frequency search response message after receiving the list of candidate GSM cells;

sending the mobile a candidate frequency search control message indicating that the mobile measure a surrounding GSM network;

measuring the surrounding GSM network;

sending a report of the measurements to the MSN; and selecting a GSM cell for handoff based on the report.

* * * * *